US008884507B2

(12) United States Patent
Davis et al.

(10) Patent No.: US 8,884,507 B2
(45) Date of Patent: Nov. 11, 2014

(54) REFLECTIVE NANOFIBER LIGHTING DEVICES

(75) Inventors: James Lynn Davis, Holly Springs, NC (US); Howard J. Walls, Apex, NC (US); Karmann Mills, Apex, NC (US); Vijay Gupta, Morrisville, NC (US); Michael Kasper Lamvik, Durham, NC (US)

(73) Assignee: Research Triangle Institute, Research Triangle Park, NC (US)

( * ) Notice: Subject to any disclaimer, the term of this patent is extended or adjusted under 35 U.S.C. 154(b) by 214 days.

(21) Appl. No.: 13/513,433

(22) PCT Filed: Nov. 17, 2010

(86) PCT No.: PCT/US2010/057007
§ 371 (c)(1),
(2), (4) Date: Jul. 23, 2012

(87) PCT Pub. No.: WO2011/068682
PCT Pub. Date: Jun. 9, 2011

(65) Prior Publication Data
US 2012/0281428 A1 Nov. 8, 2012

Related U.S. Application Data

(60) Provisional application No. 61/266,323, filed on Dec. 3, 2009.

(51) Int. Cl.
*G02B 5/02* (2006.01)
*F21V 8/00* (2006.01)
*B82Y 20/00* (2011.01)

(52) U.S. Cl.
CPC ............... *B82Y 20/00* (2013.01); *G02B 6/0041* (2013.01)

USPC ............................................. 313/498

(58) Field of Classification Search
None
See application file for complete search history.

(56) References Cited

U.S. PATENT DOCUMENTS

| 3,932,780 A | 1/1976 | DeCaro et al. |
| 4,475,892 A | 10/1984 | Faunce |
| 5,892,621 A | 4/1999 | McGregor et al. |

(Continued)

FOREIGN PATENT DOCUMENTS

| DE | 10 2007 037 875 A1 | 2/2009 |
| WO | WO 99/26091 | 5/1999 |
| WO | WO 2008/058168 A2 | 5/2008 |
| WO | 2009 140381 | 11/2009 |

OTHER PUBLICATIONS

U.S. Appl. No. 13/938,754, filed Jul. 10, 2013, Davis, et al.

(Continued)

*Primary Examiner* — Britt D Hanley
(74) *Attorney, Agent, or Firm* — Oblon, Spivak, McClelland, Maier & Neustadt, L.L.P.

(57) ABSTRACT

A fiber-based reflective lighting device and a lighting device. The fiber-based reflective lighting device includes a source configured to generate a primary light, a mat of reflective fibers which diffusely reflects light upon illumination with at least the primary light, and a light exit configured to emanate the reflected light. The lighting device includes a housing, a source configured to generate primary light and direct the primary light into the housing, a reflective mat of fibers disposed inside the housing at a position to reflect the primary light, and a light exit in the housing configured to emanate the reflected light from the housing.

60 Claims, 31 Drawing Sheets

(56) References Cited

U.S. PATENT DOCUMENTS

| | | | |
|---|---|---|---|
| 6,015,610 | A | 1/2000 | Minor et al. |
| 7,014,803 | B2 | 3/2006 | Perez et al. |
| 7,144,131 | B2 | 12/2006 | Rains |
| 2006/0072314 | A1 | 4/2006 | Rains |
| 2008/0094829 | A1 | 4/2008 | Narendran et al. |
| 2008/0113214 | A1 | 5/2008 | Davis et al. |
| 2008/0291670 | A1 | 11/2008 | Rains |
| 2009/0103293 | A1 | 4/2009 | Harbers et al. |
| 2009/0103296 | A1 | 4/2009 | Harbers et al. |
| 2009/0251884 | A1 | 10/2009 | Rains |
| 2011/0249433 | A1 | 10/2011 | Harbers et al. |
| 2012/0014089 | A1 | 1/2012 | Rains |
| 2012/0033403 | A1 | 2/2012 | Lamvik et al. |
| 2013/0058081 | A1 | 3/2013 | Harbers et al. |

OTHER PUBLICATIONS

The Extended European Search Report issued Apr. 29, 2013, in Application No. / Patent No. 10834940.8-1504 / 2507052 PCT/US2010057007.

Thomasnet News, "Silicone Gel offers refractive index of 1.40," Master Bond Adhesives & Sealants, pp. 1-6, (Jun. 4, 2009).

International Search Report Issued Feb. 16, 2011 in PCT/US10/057007 Filed Nov. 17, 2010.

U.S. Appl. No. 14/123,248, filed Dec. 2, 2013, Davis, et al.

U.S. Appl. No. 14/103,110, filed Dec. 11, 2013, Davis, et al.

Combined Chinese Office Action and Search Report issued Jan. 30, 2014 in Patent Application No. 201080060969.8 (submitting English translation only).

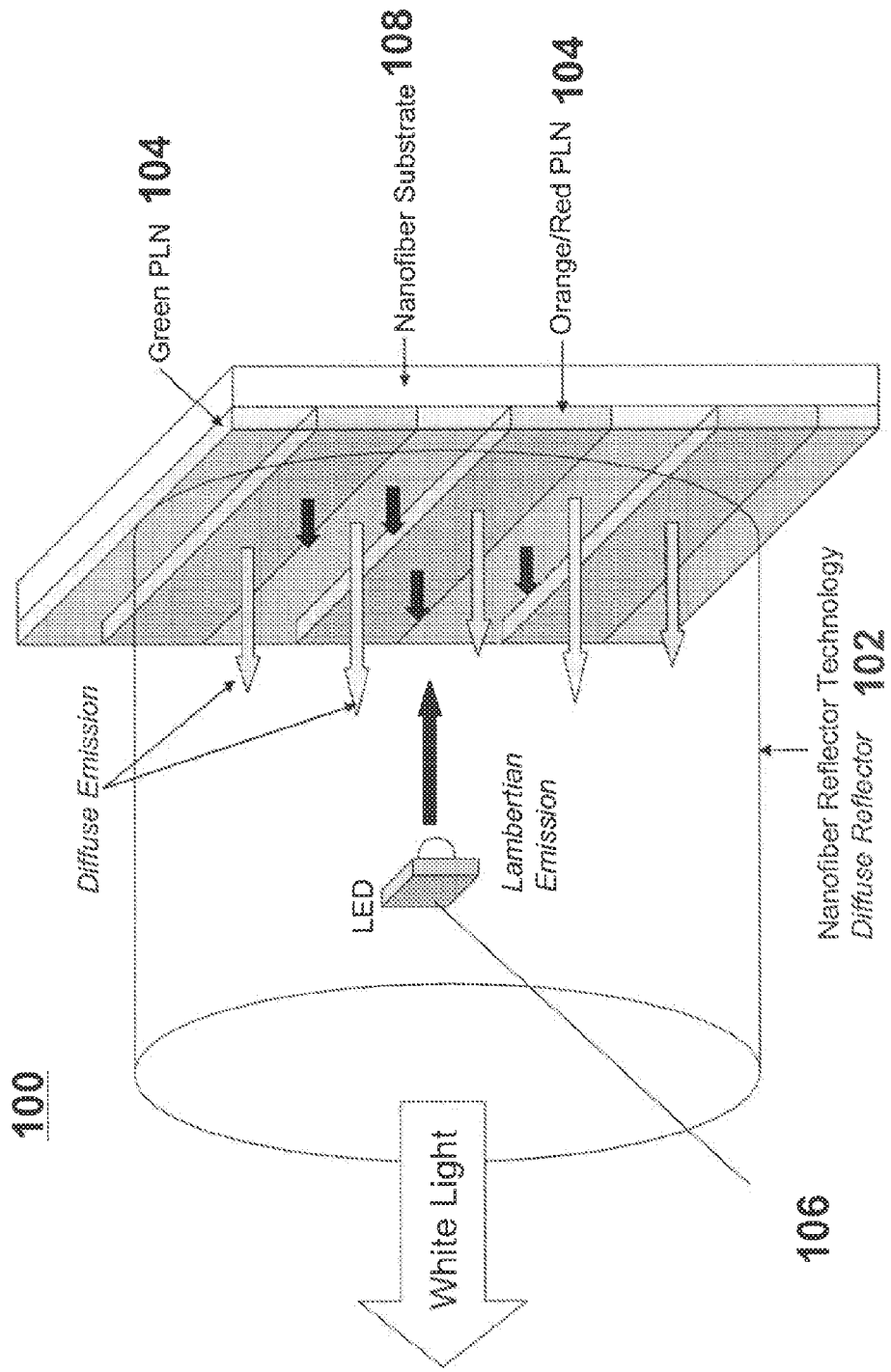

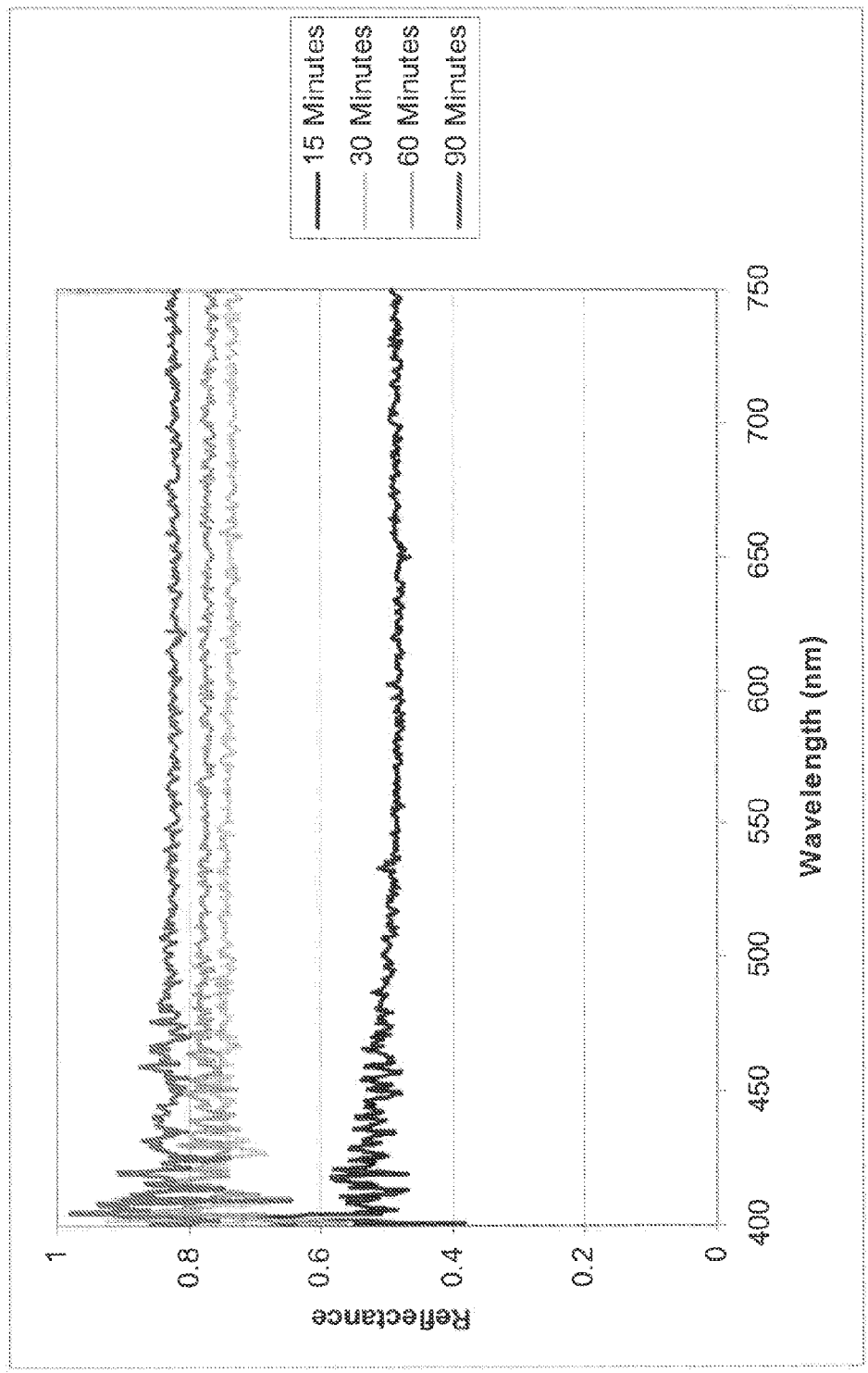

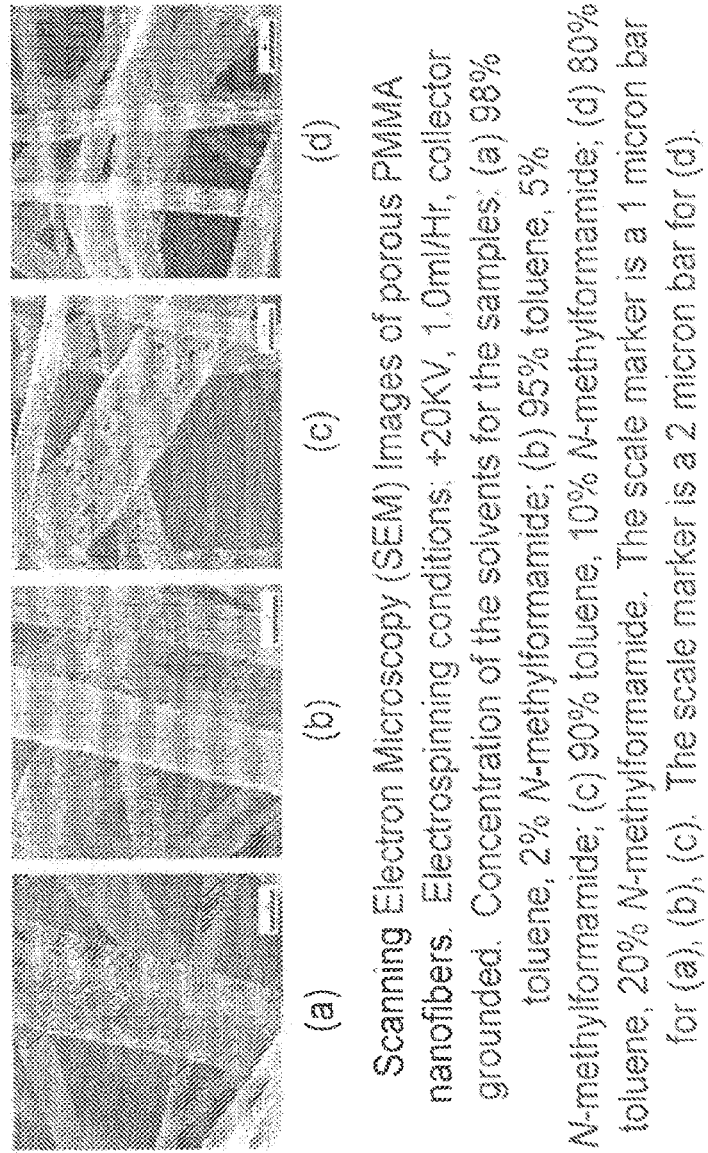

FIG. 2E-2

Scanning Electron Microscopy (SEM) Images of porous PMMA nanofibers. Electrospinning conditions: +20KV, 1.0ml/Hr, collector grounded. Concentration of the solvents for the samples: (a) 98% toluene, 2% N-methylformamide; (b) 95% toluene, 5% N-methylformamide; (c) 90% toluene, 10% N-methylformamide; (d) 80% toluene, 20% N-methylformamide. The scale marker is a 1 micron bar for (a), (b), (c). The scale marker is a 2 micron bar for (d).

Scanning Electron Microscopy (SEM) images of porous PMMA nanofibers. Electrospinning conditions: +20kV, 1.0ml/␣h, collector grounded. Concentration of the solvents for the samples: (a) 98% toluene, 2% N-methylformamide,

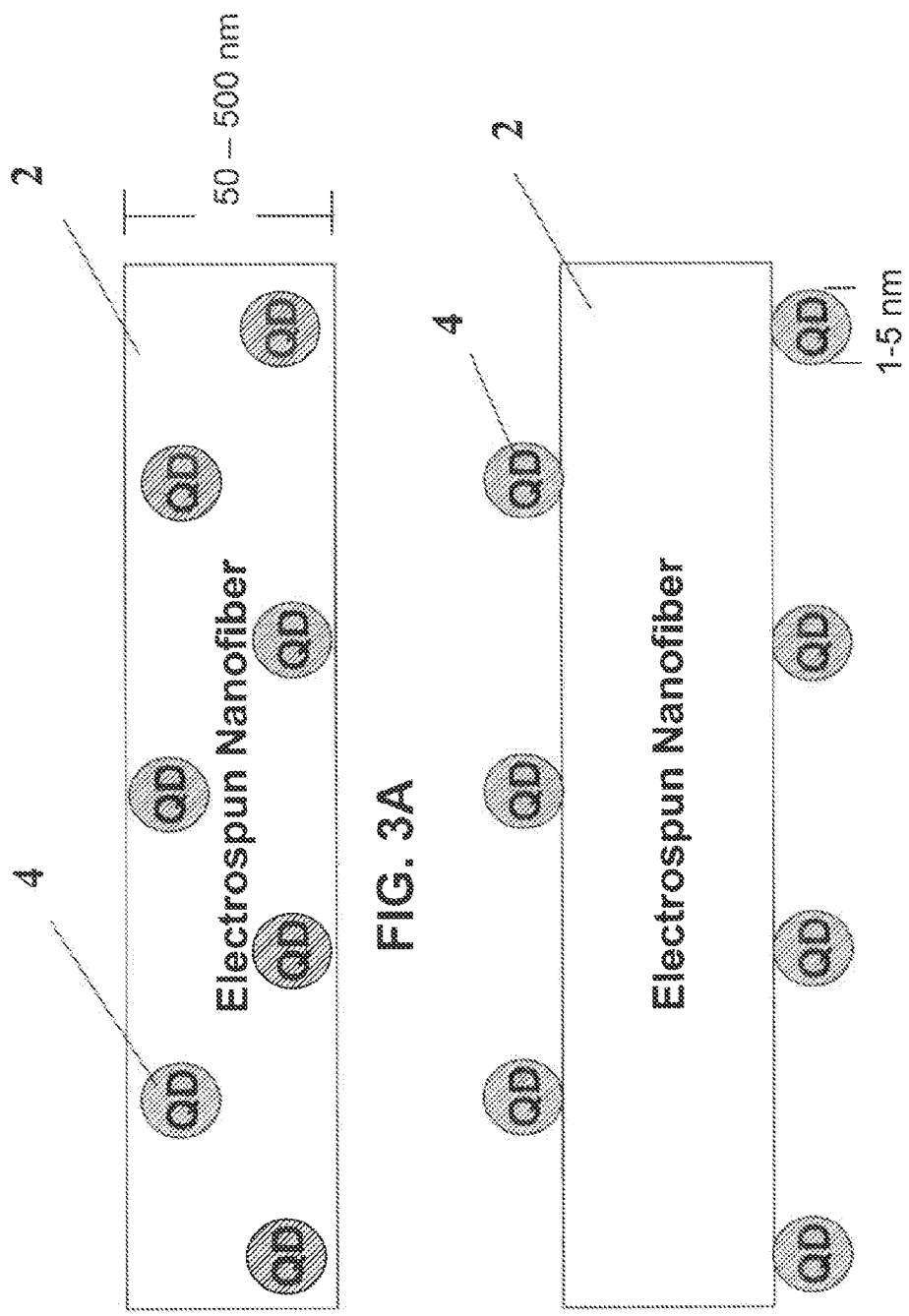

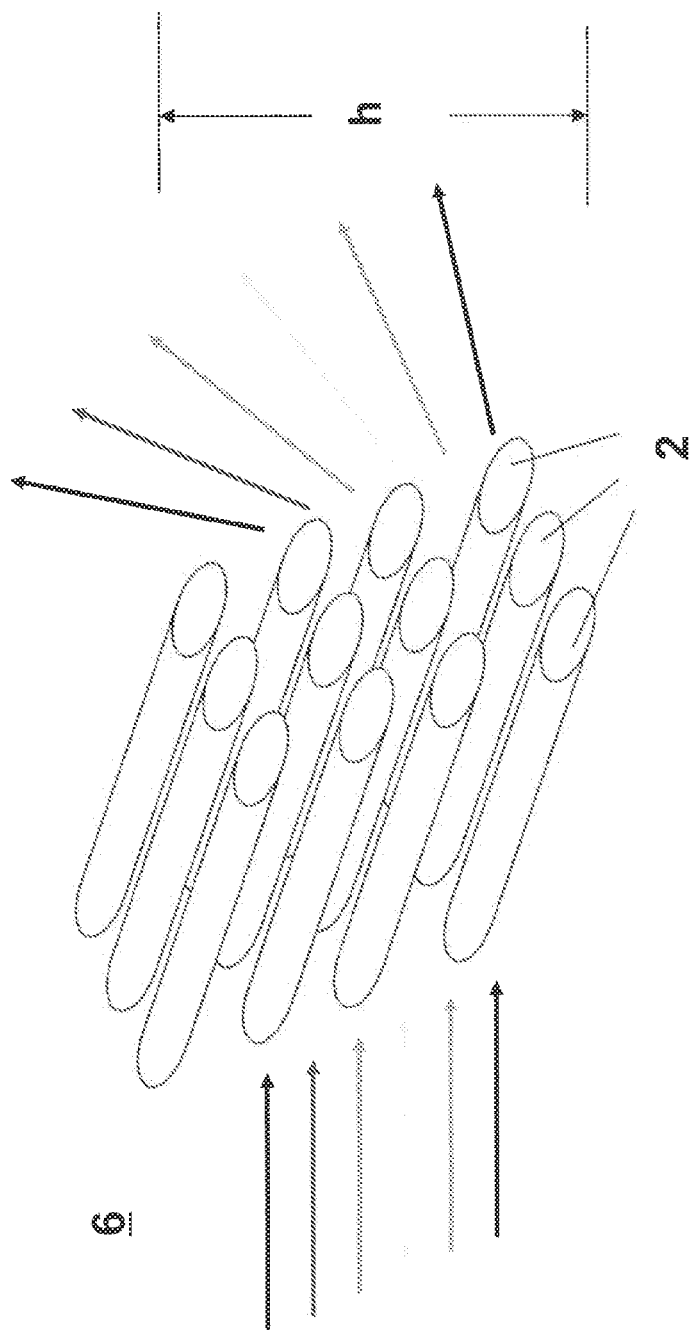

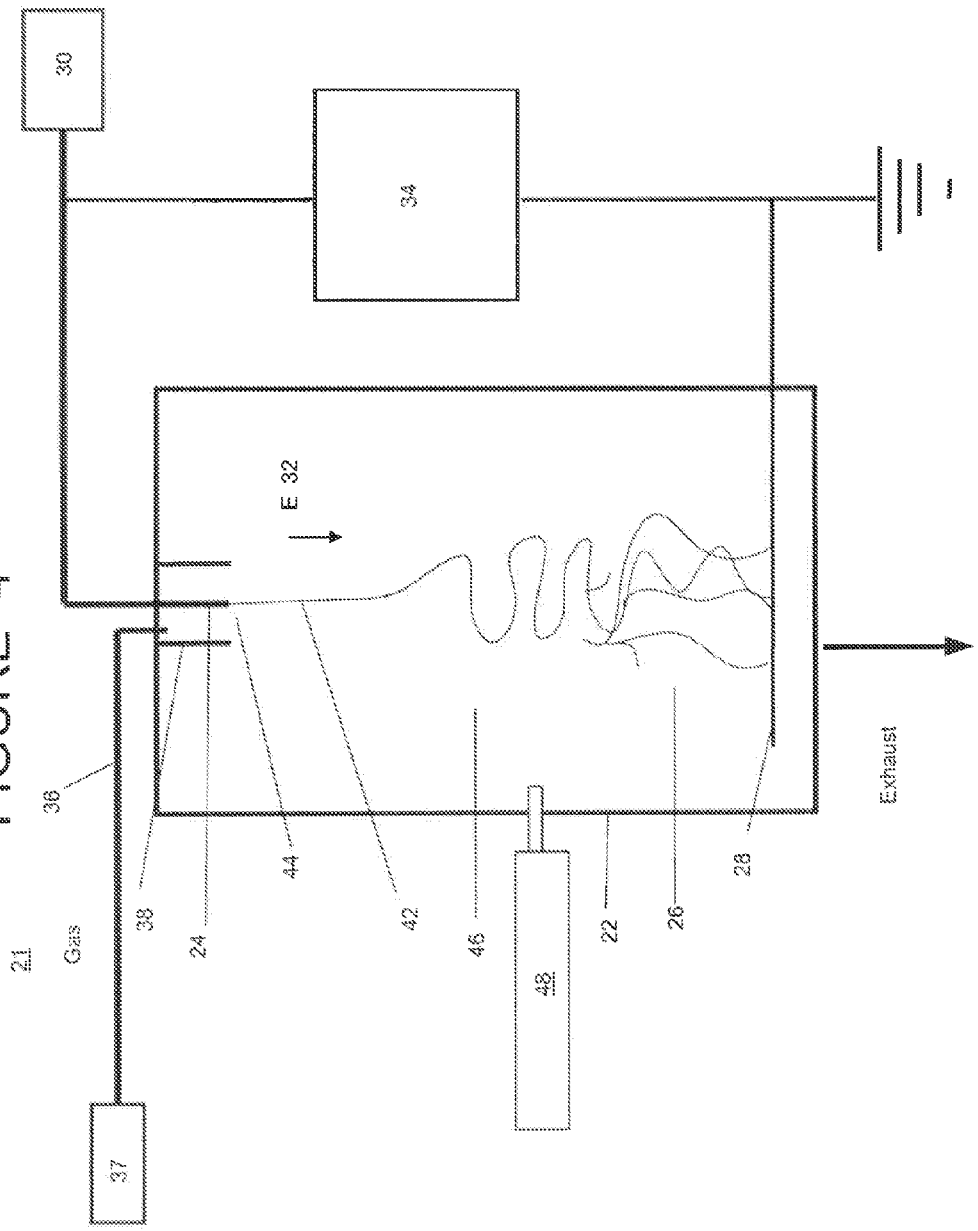

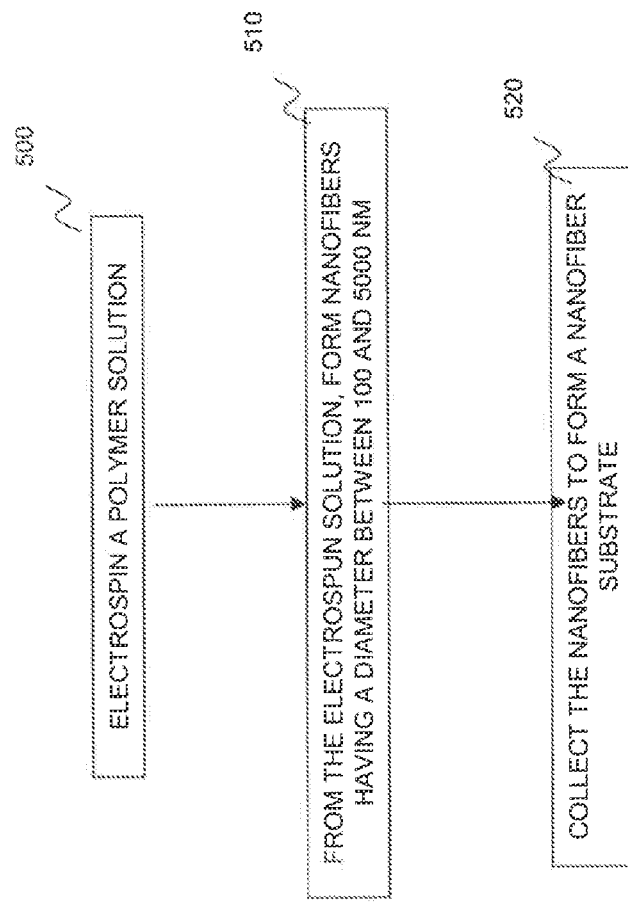

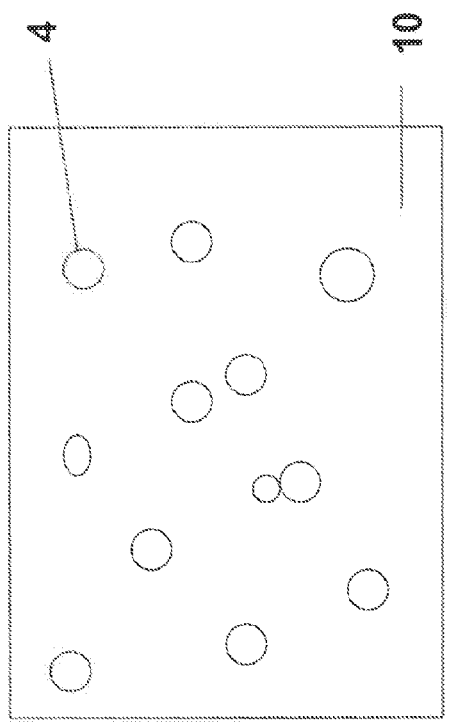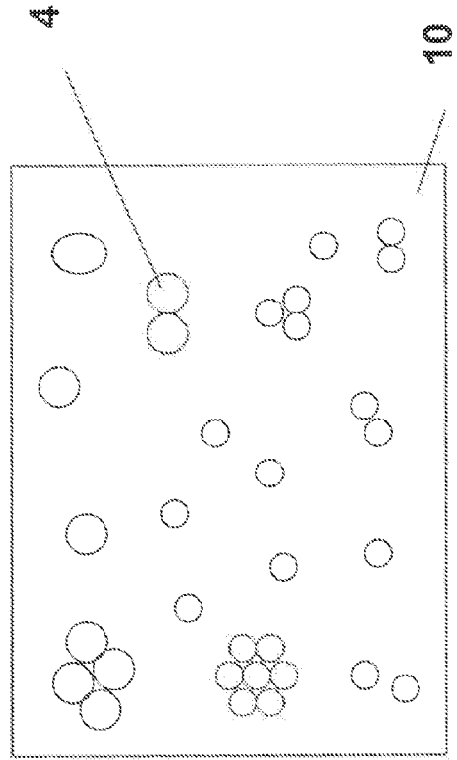
FIG. 6A
FIG. 6B

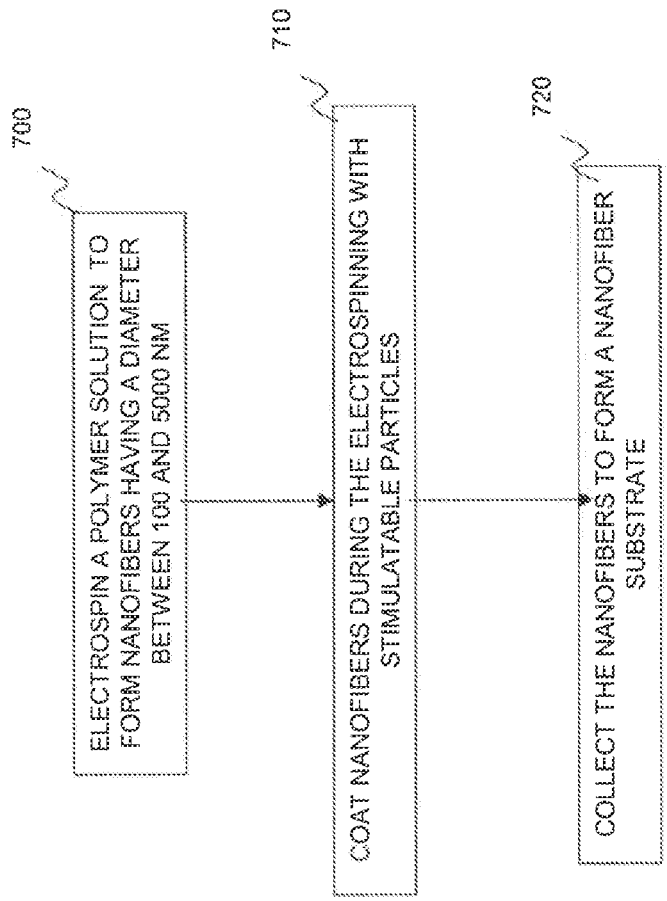

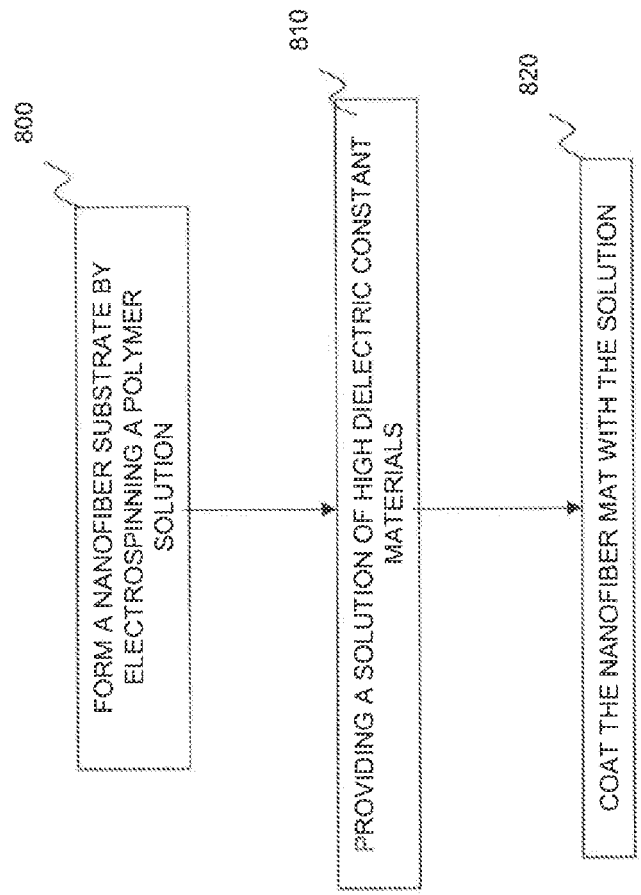

Primary light ⟶

Reflected diffuse light ⟶

Primary light →

Reflected diffuse light →

REFLECTIVE NANOFIBER LIGHTING DEVICES

CROSS REFERENCE TO RELATED APPLICATIONS

This application is related to and claims priority from U.S. Application Ser. No. 61/266,323 filed Dec. 3, 2009, the entire contents of which are incorporated herein by reference. This application is related to U.S. application Ser. No. 10/819,916, filed on Apr. 8, 2004, entitled "Electrospinning of Polymer Nanofibers Using a Rotating Spray Head," the entire contents of which are incorporated herein by reference. This application is also related to U.S. application Ser. No. 10/819,942, filed on Apr. 8, 2004, entitled "Electrospray/electrospinning Apparatus and Method," the entire contents of which are incorporated herein by reference. This application is related to U.S. application Ser. No. 10/819,945, filed Apr. 8, 2004, entitled "Electrospinning in a Controlled Gaseous Environment," the entire contents of which are incorporated herein by reference. This application is related to U.S. Ser. No. 11/130,269, filed May 17, 2005 entitled "Nanofiber Mats and Production Methods Thereof," the entire contents of which are incorporated herein by reference. This application is related to U.S. application Ser. No. 11/559,260, filed on Nov. 13, 2006, entitled "LUMINESCENT DEVICE," the entire contents of which are incorporated herein by reference. This application is related to U.S. Ser. No. 60/929,077, filed Jun. 12, 2007 entitled "Long-Pass Optical Filter Made from Nanofibers," the entire contents of which are incorporated herein by reference. This application is related to PCT/US2008/066620, filed Jun. 12, 2008 entitled "Long-Pass Optical Filter Made from Nanofibers," the entire contents of which are incorporated herein by reference. This application is related to PCT/US2009/043784, filed May 13, 2008 entitled "POROUS AND NON-POROUS NANOSTRUCTURES AND APPLICATION THEREOF." This application is related to U.S. Application Ser. No. 61/169,468, filed on Apr. 15, 2009, entitled "STIMULATED LIGHTING DEVICE," the entire contents of which are incorporated herein by reference.

BACKGROUND OF THE INVENTION

1. Field of the Invention

This is invention is related to device and apparatus and methods for producing white light from luminescent particle excitation and emission.

2. Description of the Related Art

The choice of general illumination sources for commercial and residential lighting is generally governed by a balance of energy efficiency and the ability to faithfully produce colors as measured by the color rendering index (CRI). Existing fluorescent lighting is known to be economical from an energy consumption point of view. However, many users complain that the light produced by the existing fluorescent lighting is of poor spectral quality and produces eye strain and other adverse health effects. Incandescent light is also widely used and is recognized as having excellent spectral quality and the ability to accurately render colors. This high spectral quality is derived from the hot filament, which serves as a blackbody radiator and emits light over many wavelengths, similar to the sun. However, incandescent lighting suffers from very low energy efficiency. Thus, there is a long felt need to produce light sources that use less energy and have a light composition similar to the composition of the sun light.

Solid-state lighting (SSL) is an alternative general illumination and lighting technology that promises the energy efficiency of fluorescent lights and the excellent spectral qualities of incandescent lighting. Typically, commercially available SSL lamps consists of a light emitting diode (LED) surrounded by a phosphor composed of large particles usually larger than 2 µm. The light emitted from the LED is of sufficient energy to cause the phosphor to fluoresce and emit one or more colors of visible light. The most common example of commercial SSL products consists of a blue LED (typically 460 nm) surrounded by a yellow phosphor, such as cerium-doped yttrium aluminum garnet (YAG:Ce), that emits lights in a broad band centered at 550 nm. The combination of nominally yellow light emission from the phosphor and blue light from the LED produces a light source that has a generally white appearance. Alternatively, an LED that emits in the ultraviolet (<400 nm) can be used to excite a blend of red, green, and blue phosphors. FIG. 1 is a schematic depiction of the spectrum of light obtained from a solid-state lighting device. While this approach produces white light, it suffers from low efficiency and poor spectral quality due to the limited number of wavelengths.

In addition, while the light intensity from lamps used in current solid-state lighting products is sufficient for applications such as flashlights, it is considered too low and the emission cone is considered too narrow for use in general illumination applications such as room lighting. Hence, there is a need for solid-state light sources that are capable of providing high intensity white light emissions over a large enough area for use in general illumination.

One approach proposed to improve the performance of SSL devices has been to use nanoparticles such as quantum dots as secondary converters to produce white light. "Quantum Dots Lend New Approach to Solid-State Lighting," Sandia National Laboratory press release Jul. 24, 2003. This approach incorporates quantum dots into a polymer used to encapsulate the light emitting diode (LED) and essentially creates a three-dimensional dome of quantum dots around the LED die. While this method has been successful in producing white light, the three-dimensional dome structure places large quantities of quantum dots in non-optimal positions around the LED and creates potential quantum dot agglomeration issues.

Previously, polymer/quantum dot compound nanofibers have been obtained from electrospinning of the polymer/quantum dot composite solutions, as disclosed in Schlecht et. al., Chem. Mater. 2005, 17, 809-814. However, the nanofibers produced by Schlecht et al. were on the order of 10-20 nm in diameter, in order to produce quantum confinement effects. The size range of the nanoparticles and nanofibers disclosed therein is not advantageous for conversion of a primary light into secondary light emission across the white light spectrum.

Lu. et. al., Nanotechnology, 2005, 16, 2233, also reported the making of $Ag_2S$ nanoparticles embedded in polymer fiber matrices by electrospinning. Once again, the size range of the nanoparticles and nanofibers shown therein is not advantageous for conversion of a primary light into secondary light emission across the white light spectrum.

As described in U.S. application Ser. No. 11/559,260, filed on Nov. 13, 2006, entitled "LUMINESCENT DEVICE," referenced above, highly-efficient, light-producing sheets have been developed based on a combination of photoluminescent particles and polymer nanofibers. These luminescent sheets can be used in a white-light solid-state lighting device in which the sheets are illuminated by a blue light-emitting diode (LED) light source and the sheets will transform the incident blue light into, for example, yellow light. An appropriate mixture of yellow and blue light will produce the appearance of white light.

One particular advantage of these light-producing sheets is that photoluminescent particles are suspended in air on the nanofibers instead of being contained in a bulk material with a relatively high index of refraction. This arrangement prevents light from being trapped by total internal reflection, as occurs when the particles are encapsulated within bulk materials.

Other work (listed below and incorporated herein in their entirety by reference) has studied nanofibers in optical configurations where the unique nano-scale optical properties of the nanofibers were observed.

1. P. Vukusic, B. Hallam, and J. Noyes, Science 315, 348 (2007);
2. J. L. Davis, A. L. Andrady, D. S. Ensor, L. Han, H. J. Walls, U.S. patent application U.S. 20080113214 (submitted November 2006); H. J. Walls, J. L. Davis, and D. S. Ensor, PCT Patent Application WO2009/032378 (submitted June 2007); and J. L. Davis, H. J. Walls, L. Han, T. A. Walker, L A. Tufts, A. Andrady, D. S. Ensor, in *Seventh International Conference on Solid State Lighting*, edited by I. T. Ferguson, N. Narendan, T. Taguchi, and I. E. Ashdown, (SPIE Proceedings 6669) pp. 666916-1-666916-9;
3. J. Yip. S.-P. Ng, and K.-H. Wong, Textile Research Journal 79, 771 (2009);
4. U.S. Pat. No. 5,892,621, "Light reflectant surface for luminaires"
5. U.S. Pat. No. 6,015,610 "Very thin highly light reflectant surface and method for making and using the same"

SUMMARY OF THE INVENTION

In one embodiment of the invention, there is provided a fiber-based reflective lighting device which includes a source configured to generate a primary light, a mat of reflective fibers which diffusely reflects light upon illumination with at least the primary light, and a light exit configured to emanate the reflected light.

In another embodiment of the invention, there is provided a lighting device which includes a housing, a source configured to generate primary light and direct the primary light into the housing, a reflective mat of fibers disposed inside the housing at a position to reflect the primary light, and a light exit in the housing configured to emanate the reflected light from the housing.

In another embodiment of the invention, there is provided a lighting device insert which includes a reflective mat of fibers for insertion in a lighting device at a position and configured to diffusively reflect at least 70% of incident light.

It is to be understood that both the foregoing general description of the invention and the following detailed description are exemplary, but are not restrictive of the invention.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 2A is a schematic depicting a downlight device made using the reflective nanofiber and photoluminescent nanofibers;

FIG. 2B-1 is a graph showing examples of nylon nanofiber substrates of different thicknesses and the observed diffuse reflectances across the visible spectrum for a variety of nanofibers of the invention;

FIG. 2B-2 is a graph showing examples of poly(methyl methacrylate) nanofiber substrates of different electrospinning duration and the observed diffuse reflectances across the visible spectrum for a variety of nanofibers of the invention;

FIG. 2E-1 is a micrograph of a mat of reflective fibers having large lateral reflective surfaces;

FIG. 2E-2 is a micrograph of a mat of reflective fibers showing porous PMMA nanofibers made under different electrospinning conditions;

FIG. 2E-3 is another micrograph of a mat of reflective fibers showing flatter-shaped nanofibers;

FIG. 3A is schematic depicting the disposition of luminescent compounds inside a volume of a fiber, according to one embodiment of the invention;

FIG. 3B is schematic depicting the disposition of luminescent compounds on or near the surface of a fiber, according to one embodiment of the invention;

FIG. 3C is schematic depicting a fiber substrate, according to one embodiment of the invention, in which the fiber substrate in total serves as an optical scattering center;

FIG. 4 is a schematic illustration depicting an electrospinning apparatus suitable for deposition of fibers and/or nanofibers of the invention including nanoparticle light emitters;

FIG. 5 is a flow chart illustrating a method for forming a reflective nanofiber substrate device according to an embodiment of the invention;

FIG. 6A is a schematic of a quantum dot dispersion in a polymer matrix at a concentration where agglomeration is present only at a low concentration;

FIG. 6B is a schematic of a quantum dot dispersion in a polymer matrix at a concentration where agglomeration is a factor;

FIG. 7 is a flow chart illustrating a method for forming a luminescent device according to an embodiment of the invention in which luminescent particles are attached to the electrospun fiber during the electrospinning process;

FIG. 8 is a flow chart illustrating a method for forming a luminescent device according to an embodiment of the invention in which luminescent particles are attached to the electrospun fiber after the electrospinning process;

DETAILED DESCRIPTION OF THE EMBODIMENTS

Figure 1:
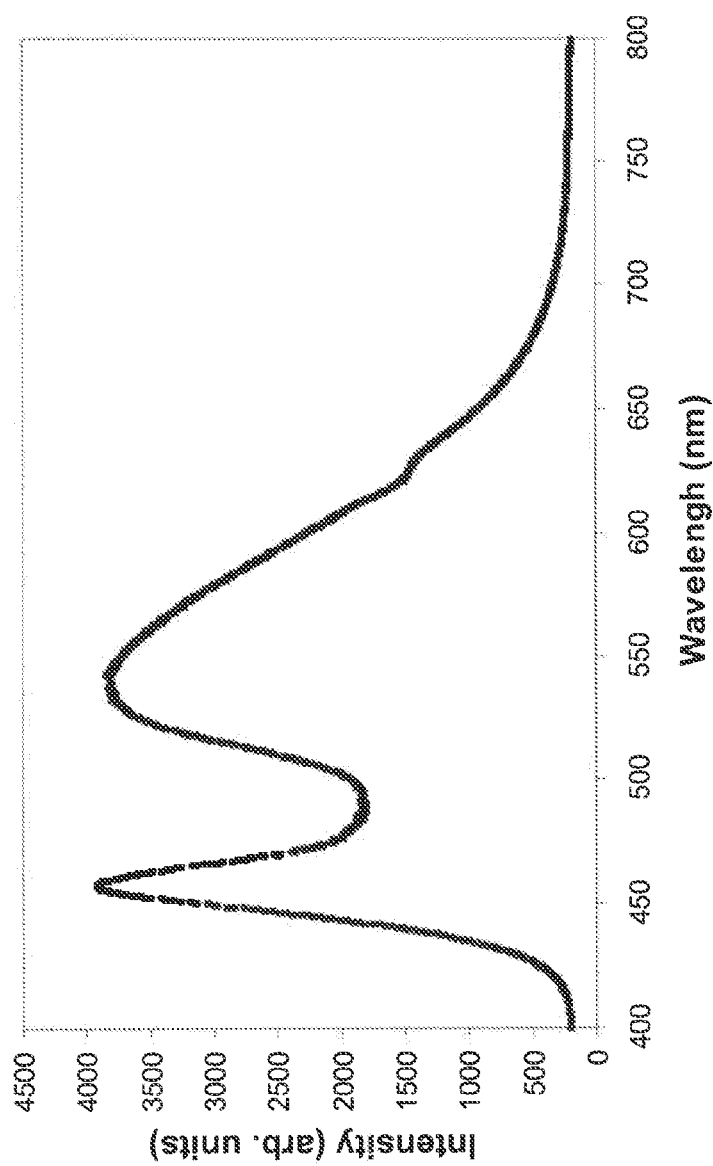
FIG. 1 is a schematic depiction of the spectrum of light obtained from a conventional solid-state lighting device.

Lighting devices for general illumination can be fabricated by combining a pump wavelength (e.g., blue emission in the 440-470 nm range; violet emission in the 380-440 nm range; or ultraviolet emission in the 330-380 nm range) with one or more photoluminescent materials that emit at wavelengths longer than the pump light. The photoluminescent material may be of multiple chemistries and particle sizes including phosphors, nanophosphors, and quantum dots. The luminescent material is often brittle and requires a binder or support matrix in order to be incorporated into practical devices.

In one embodiment of the invention, a lighting device includes luminescent particles combined with a polymeric material that provides mechanical strength and imparts desirable optical properties to the resulting photoluminescent layer. For example, it is desirable in some lighting applications to have a photoluminescent layer that includes a blend of light transmission and light reflection properties, which can be achieved through the judicious choice of materials for the composite. Alternatively, in some embodiments of the invention, it is desirable to have a photoluminescent layer that provides a high degree of light reflection. Alternatively, in some embodiments of the invention, it is desirable to have a fiber mat layer separate from the photoluminescent layer that provides a high degree of light reflection.

One way to control the transmission and reflection properties of the photoluminescent layer is by controlling the index of refraction of the photoluminescent layer. For example, a photoluminescent layer that is index matched with its surrounding medium will display a large light transmission, while a material that is not index matching will display a mixture of light transmission and light reflection. The extent of light reflection in such a media is determined by the difference in the index of refraction of the photoluminescence layer to the surrounding media through the Fresnel equations.

One alternative way to control the transmission and reflection properties of the photoluminescent layer is to introduce features with dimensions on the order of the wavelength of light. Such features, typically 100 nm to 800 nm in size, will promote scattering of the light beam, which increases the reflection coefficient. The features may be of a different refractive index than their surroundings which will impart transmission and reflection properties governed by the Fresnel equations. Examples of materials which can be incorporated into the photoluminescent layer include such materials as polymeric nanofibers, natural and synthetic papers such as PolyArt®, and etched glasses and plastics.

Light scattering occurring in the photoluminescent layer may also be used to increase the ability of the material to diffuse light or spread its intensity over a larger area. In the extreme, light scattering can be used to produce a Lambertian scatterer in which the intensity of the object appears the same regardless of the viewing angle.

The photoluminescent layer can be created in one embodiment by adding a range of photoluminescent materials to a polymeric or ceramic material that imparts the ability to control the transmission and reflection of light. Such photoluminescent materials include phosphors, nanophosphors, and quantum dots.

Phosphors are a general class of materials that emit radiation when exposed to radiation of a different wavelength. In one embodiment of the invention, such phosphors are generally exposed to either a blue, violet, or ultraviolet light source (i.e., pump) and will absorb photons from the incident light source creating an excited electronic state. This excited state can emit a photon at a wavelength that is generally longer than the pump wavelength through the process of fluorescence or more specifically photoluminescence. Phosphors are generally made from a suitable host material (e.g., aluminum garnet, metal oxides, metal nitrides, and metal sulfides) to which an activator (e.g., copper, silver, europium, cerium and other rare earths) is added. Typically, the phosphor particle size is often 1 μm or larger. Recently, phosphors have been developed that are characterized by particles sizes below 100 nm. These nanophosphors often have similar chemistries as larger particle sizes but scatter light to a lesser degree due to their small size.

Particles having a size less than 50 nm often can be classified as quantum dots. Quantum dots are nanoparticles whose dimensions have an order of magnitude equivalent to or smaller than the size of an electron at room temperature (deBroglie wavelength). When the size of the quantum dot is roughly the same or smaller than the deBroglie wavelength of an electron, then a potential well is created that artificially confines the electron. The size of this potential well determines the quantized energy levels available to the electron, as described in the "particle-in-a-box" solution of basic quantum mechanics. Since the energy levels determine the fluorescent wavelengths of the quantum dot, merely changing the size of the quantum dot changes, to a first approximation, the color at which the quantum dot radiates visible light. Thus, the quantum confinement effects of the quantum dots directly influence the light emitted from the respective quantum dot, and a broad spectrum of colors may be achieved by assembling quantum dots of different sizes.

A typical quantum dot includes a nanocrystalline core that may be surrounded by a shell of an inorganic material with a higher band gap. This structure is capped with an external organic layer that ensures compatibility with various solvents. In this context, the entire assembly (i.e., nanocrystalline core, shell of higher band gap material, and organic capping layer) is referred to collectively as a quantum dot. A representative example of such quantum dots includes a cadmium selenide nanocrystalline core surrounded by a zinc sulfide shell and capped with organic ligands such as trioctylphosphine oxide or a long-chain amine such as hexadecylamine. Such core shell structures are sold by Evident Technologies of Troy, N.Y.

The nanocrystalline core of quantum dots may be fabricated from a variety of materials including but not limited to at least one of silicon, germanium, indium gallium phosphide, indium phosphide, cadmium sulfide, cadmium selenide, lead sulfide, copper oxide, copper selenide, gallium phosphide, mercury sulfide, mercury selenide, zirconium oxide, zinc oxide, zinc sulfide, zinc selenide, zinc silicate, titanium sulfide, titanium oxide, and tin oxide, etc. Of particular utility to the invention are quantum dots having a core of at least one of CdSe, InGaP, InP, GaP, and ZnSe. The optical properties of quantum dots are produced by this nanocrystalline core.

Quantum dots are commercially available as colloidal dispersions in low dielectric constant (low-K) organic solvents such as toluene. However, quantum dots experience mutual attraction and can agglomerate, which may disrupt their quantum behavior and change their performance characteristics. For example, agglomeration is known to reduce the light emission efficiency of quantum dots and is known to cause red-shifts in emission frequency due to energy transfer to larger dots formed as a result of agglomeration. See J. Rodriguez-Viejo, K. F. Jensen, H. Mattoussi, J. Michel, B. O. Dabbousi and M. G. Bawendi, *Applied Physics Letters*, vol. 70 (1997), no. 16, page 21, the entire contents of which are incorporated herein by reference. Due to the sensitivity of the human eye to slight color variations, particle agglomeration can have a significant impact on the quality of light from an illumination source. In the extreme, agglomeration can lead to quenching of photoluminescence from quantum dots.

Nanofibers are a solid structure that has one dimension (diameter) in the 10-2000 nm range, and the other dimension (length) can be quite long in the meters range. Nanofibers suitable for the invention can be made from a variety of materials, including polymers, ceramics, and glasses, sol gels, and blends of materials can also be readily fabricated. One feature of nanofibers is their small diameter and consequently high surface area. Nanofiber diameters on the order of visible light (~500 nm) or even smaller can be readily produced creating very large surface areas.

Nanofiber Enhanced Reflectance:

As described in U.S. Application Ser. No. 61/169,468, filed on Apr. 15, 2009, entitled "STIMULATED LIGHTING DEVICE," denoted above, nanofibers can be used in various lighting applications where the nanofibers are combined with luminescent particles such that primary light obliquely incident onto a luminescent sheet made of the nanofibers and the luminescent particles will emanate secondary light. In PCT Patent Application 2009/032378, the entire contents of which are incorporated herein by reference, nanofibers were shown to be reflective below a certain cut-off wavelength and transmittive above that wavelength.

Through experimentation, the present inventors have determined that thick nanofiber substrates can exhibit excellent broad spectrum reflectance in the visible spectrum. The value of the reflectance is dependent upon several parameters including fiber diameter, fiber surface morphology, substrate thickness and density. For example, thinner less dense fiber substrates typically possesses lower reflectance than thicker denser materials.

Referring now to the drawings, wherein like reference numerals designate identical or corresponding parts throughout the several views, in various embodiments of the invention, FIG. 2A is a schematic depicting a downlight device 100 made using a reflective fiber mat 102 and photoluminescent fiber mat 104. In FIG. 2A, light emerging from a light source 106 (e.g., a LED) is directed toward the photoluminescent fiber mat 104. In one embodiment, a photoluminescent material of the photoluminescent fiber mat 104 can be made by spray coating a layer of doped silicate phosphors onto a thick nanofiber surface. The photoluminescent material can be subsequently partially coated with a layer of red-orange emitting quantum dots (emission wavelength 600 to 620 nm). The light impinging upon the photoluminescent fiber is largely prevented from passing through the fiber base 108 by its reflective properties. Instead, this light, both from the excitation source and that converted by the phosphor, is largely reflected away from the photoluminescent fiber mat 104 and the fiber base 108. This reflected light then encounters the reflective fiber mat 102, that line the walls of the lighting device 100. These reflective nanofibers in the reflective fiber mat 102 serve to mix the blue, green, and red light produced by this structure, so that only white light emanates from the exit of the lighting device.

Accordingly, in one embodiment of the invention, the reflective nanofibers are diffuse reflectors. Diffuse reflectance is the process by which a light beam at a given incidence angle and luminous intensity is reflected from a material over a wide range of angles spreading the luminous intensity over these angles. In the ideal case, diffuse reflectance will produce a material that reflects light with equal luminance in all directions.

The polymer nanofiber reflective substrate base can be used in either an undoped form or doped with luminescent materials. The nanofiber reflective substrate base can display a variety of optical properties by varying the transmittance and reflectance of the material, which can be tailored and controlled during the fabrication process. For simplicity, a nanofiber material exhibiting the ability to exhibit high diffuse reflectance across the visible spectrum is termed a nanofiber reflector (NFR).

Figures 1, 2B:
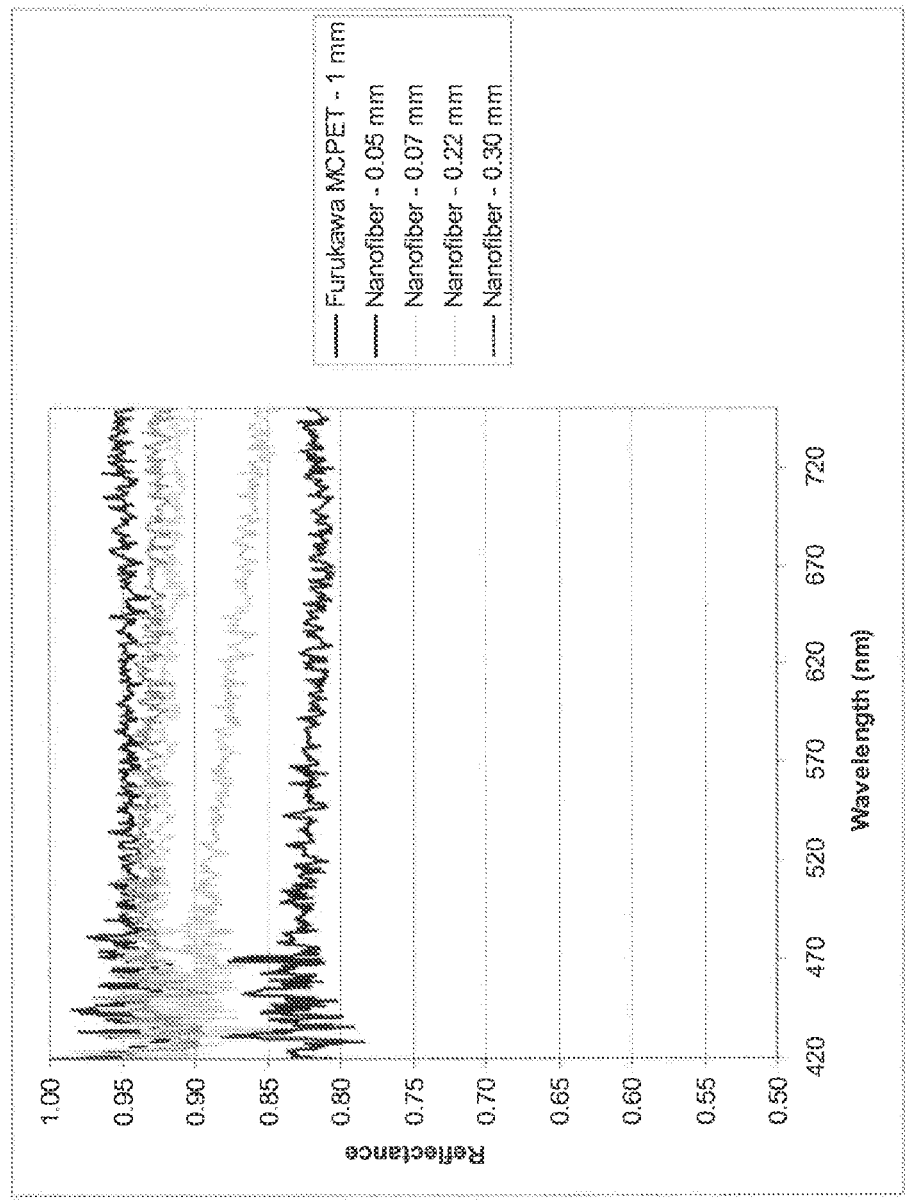

FIG. 2B-1 is a graph showing examples of nylon nanofiber substrates of different thicknesses and the observed diffuse reflectances across the visible spectrum for a variety of nanofibers of the invention. The nylon substrates include smooth nanofibers with an average fiber diameter between 100 nm and 300 nm. Each substrate was tested as a free-standing sample (i.e., without any backing) and was large than 4 inches by 4 inches.

Figure 2C:
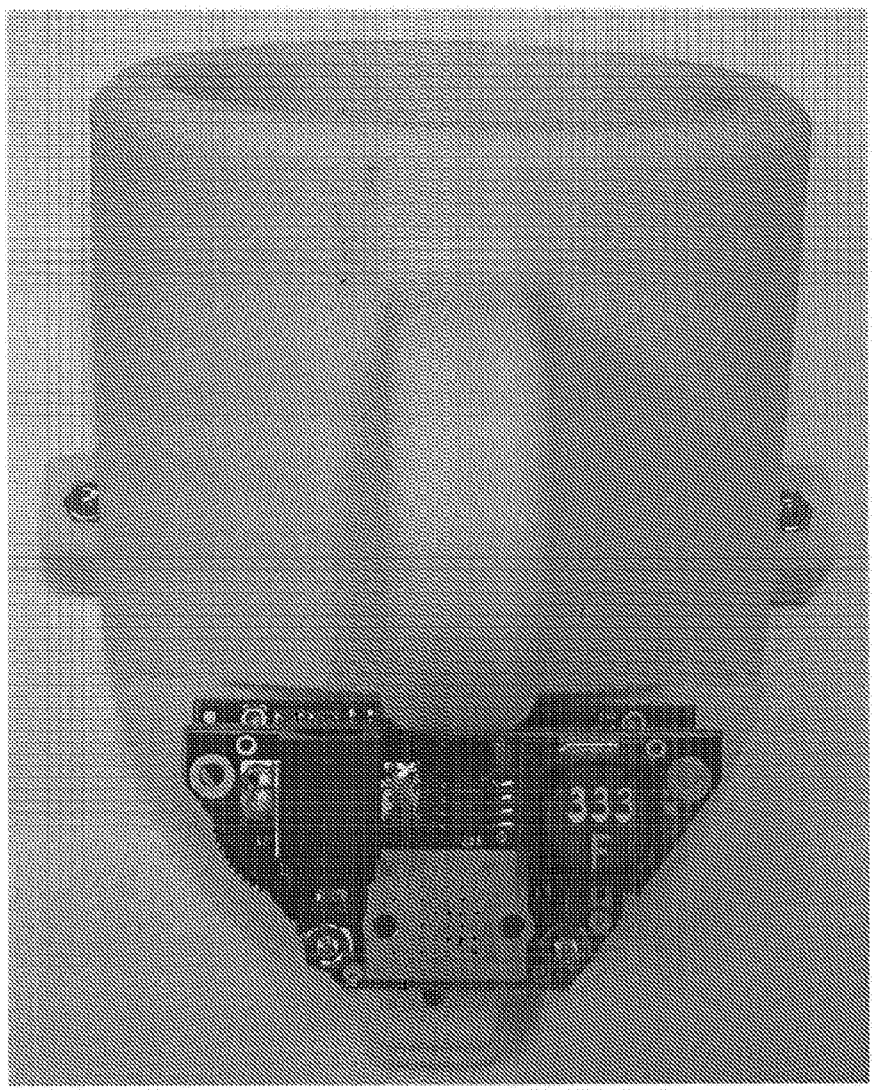
FIG. 2C is a schematic depicting a downlight device made using the reflective nanofiber and photoluminescent nanofibers where the LED is moved to the exterior of the luminaire.
Figure 2D:
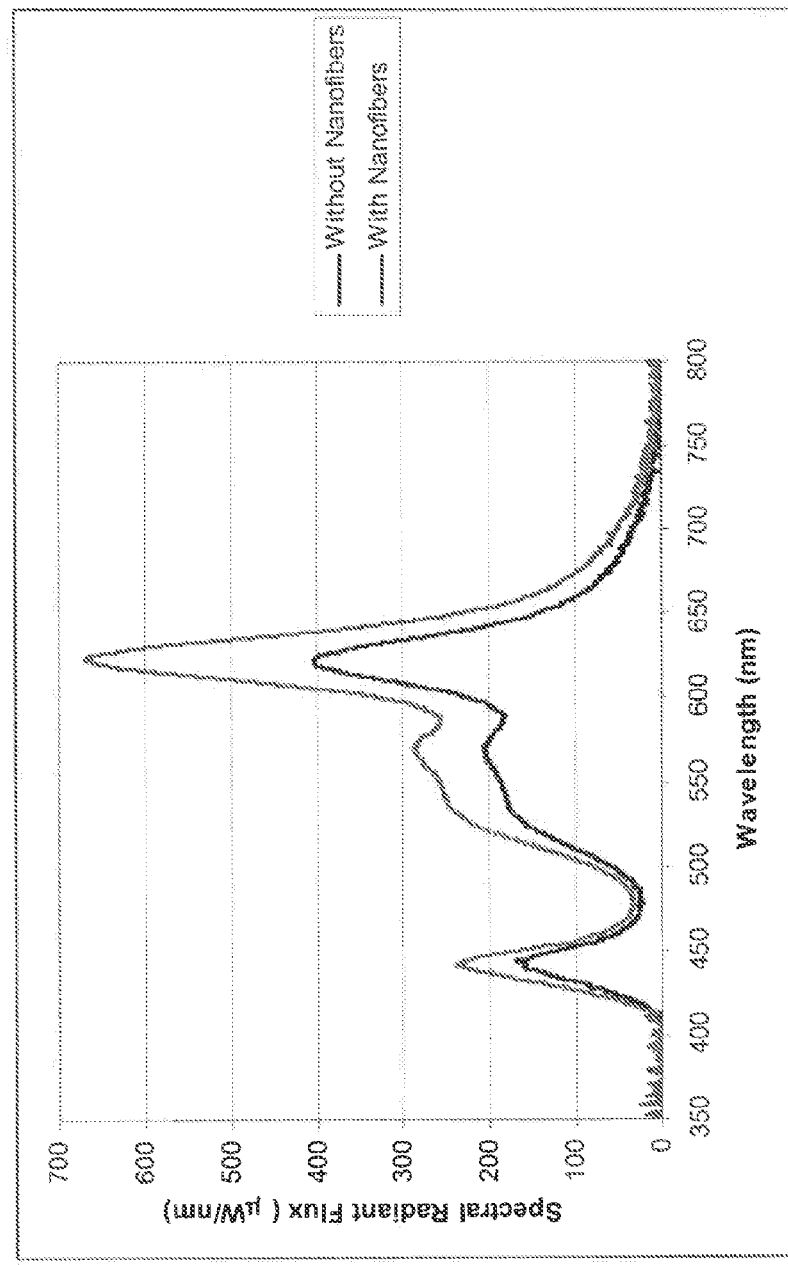
FIG. 2D is a depiction of the spectral radiant flux of the downlight reflector of FIG. 2A with and without the nanofiber reflector of the invention.
Figures 1, 2E:
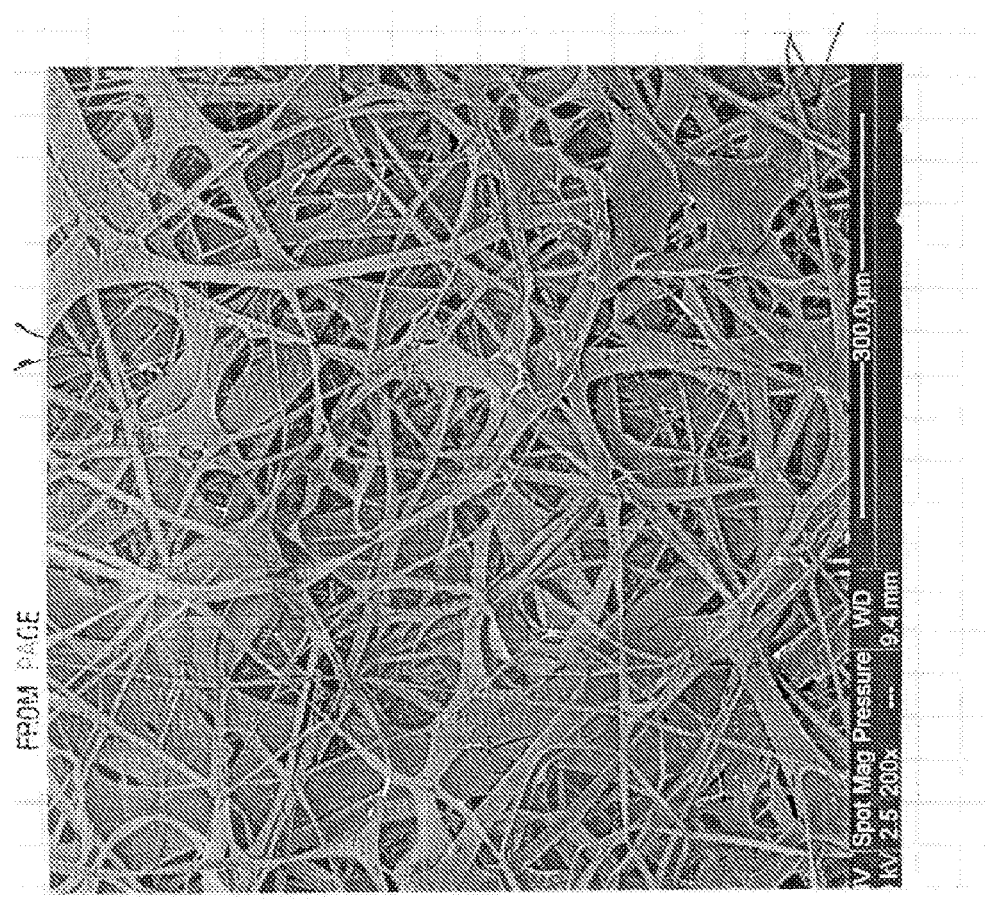
Figures 2, 2E, 3:
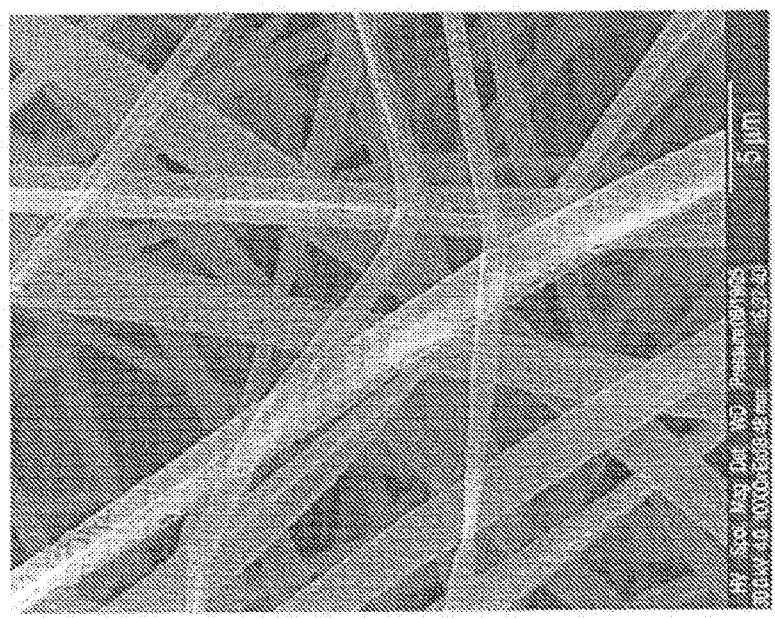

FIG. 2B-2 is a graph showing examples of poly(methyl methacrylate) nanofiber substrates of different electrospinning duration and the observed diffuse reflectances across the visible spectrum for a variety of nanofibers of the invention. The poly(methyl methacrylate) substrates consisted of smooth nanofibers with an average fiber diameter between 100 nm and 600 nm. Each substrate was tested as a free-standing sample (i.e., without any backing) and was large than 3 inches by 3 inches.

Doping of nanofibers to create PLNs is typically performed using a coating process that concentrates the luminescent material at one surface of the substrate (as described in detail below). The phosphors or quantum dots (QD) can be loaded onto nanofibers with a sufficient loading to achieve virtually any desired lighting color. Phosphors are typically coated using either solvent- (e.g., spray coating) or aerosol-based (e.g., dry coating) methods, whereas QDs are typically applied using ink-jet printing methods.

While compatible with any phosphor chemistry, doped-silicate and selenide phosphors have been demonstrated to be working examples, using for example cadmium selenide cores with zinc sulfide shells. The photostability of these quantum dots (QD) is size dependent, with the larger particles (i.e., orange/red) exhibiting the highest photostability. In one embodiment, a doped-silicate phosphor provides broad emissions centered in the green (~540 nm) and orange QDs are added to provide a narrow emission around 615 nm. The combination in one embodiment, when excited with a blue LED, produces white light (CCT: 2,700 to 5,000 K) with high color rendering indices.

In operation of a typical device, blue light emitted by a LED is directed at the PLN, and a portion of the blue light is converted into green and red emissions that are diffusely reflected away from the PLN. Unconverted portions of the incident blue radiation are also diffusely reflected by the nanofiber base of the PLN. The diffusely emitted light is confined and directed by a second nanofiber material (i.e., NFR layer) that is designed to exhibit high diffuse reflectance (R~95%). In various embodiment of the invention, diffuse reflectance values range from 70% to 80%. In various embodiment of the invention, diffuse reflectance values range from 80% to 90%. In various embodiment of the invention, diffuse reflectance values range from 90% to 95%. In various embodiment of the invention, diffuse reflectance values are greater than 95%. The high reflectance of the NFR material minimizes light absorption and also serves to mix the red, green, and blue colors produced by the device. Light produced emerges from the device well mixed with good homogeneity.

In FIG. 2A, the LED is in the light emission path and could absorb some of the emitted light. In FIG. 2C, this disadvantage is avoided. FIG. 2C is a s schematic depicting a downlight device made using the reflective nanofiber and photoluminescent nanofibers where the LED is moved to the exterior of the luminaire to remove the LED from the light beam and to provide for better heat sinking of the LED. The LED is mounted on the PCB that sits at the back of the device. Light from the LED enters the device through an aperture and is directed at the PLN. The NFR material lines the wall of the device as in the previous example.

A typical spectrum obtained using a Cree XRE LED (Part No. CREROY-L1-00001-00801) operated at 200 mA is shown in FIG. 2D, after correcting for self-absorption as described in LM-79. FIG. 2D is a depiction of the spectral radiant flux of the downlight reflector of FIG. 2A with and without the NFR of the invention. Values were corrected for self-absorption using an auxiliary lamp.

The device has been tested at drive currents of up to 800 mA. No significant changes in CCT, CRI, or chromaticity coordinate were found. The measured properties of the device at an operational current of 200 mA were:

| | |
|---|---|
| CCT: 3852K | Duv: 0.003 |
| CRI: 92 | Luminous Efficacy: 53 Lumens/Watt |
| NIST CQS: 91 | |

Duv is a measure of how far a given set of chromaticity coordinates lie from the Planckian locus (i.e., the blackbody radiator point for a give CCT). Low Duv values are preferred. CQS stands for color quality scale.

The introduction of the nanofiber liner increased the optical power output from this device by 49.8%. This increase is believed to be due to reduced absorption of the light in the down light configuration due to the presence of the reflective nanofiber material. Since the nanofibers used in this embodiment exhibit high reflectance (typically greater than 90%), the use of the material as a liner significantly reduces absorption by luminaire materials.

While not being limited to a particular phenomenological explanation, it is believed that the high reflectance of this material is due to Mie scattering arising from the nanoscale manipulation of the optical properties of the nanofiber. The contrast in index of refraction between the nanofiber (n~1.5) and air creates sites for Mie scattering of light. The intensity of the reflected light (i.e., backscattering) will be proportional to the angular scattering distribution and the number of scattering sites. In smooth nanofibers, the scattering sites are provided by the nanofibers themselves and the areas between adjacent nanofibers. Since the probability for backscattering (i.e., reflection) is optimal for visible radiation when this spacing is on the order of the wavelength of light, increasing substrate density (i.e., decreasing void volume) would improve reflection intensity to a point. On porous nanofibers, the introduction of surface pores increases the number of scattering sites and increases backscattering efficiency as a function of thickness. In addition, surface pores of diameter 100-250 nm can be shown to possess a high probability for backscattering of visible radiation. Hence, the properly designed porous nanofibers of the invention can also be shown to be efficient reflectors of visible radiation.

In one embodiment of the invention, an additional mechanism to impart a discontinuity in the index of refraction is provided by the introduction of nanomaterials into the nanofiber. Typically, these nanomaterials will have diameters between 50 nm and 400 nm, and be composed of materials that are known to exhibit low absorbance in the visible spectrum. Examples of such materials include $BaSO_4$, Teflon, $TiO_2$, and $Al_2O_3$. Such additives would be chosen to have an index of refraction different from that of the polymer used to make the nanofiber.

In one embodiment of the invention, the reflection characteristics of the nanofiber can be altered. Typically, nanofiber substrates will exhibit diffuse reflection approaching Lambertian behavior. However, a certain amount of gloss (i.e., specular reflection) can be introduced into the substrate either by intentionally electrospinning in a manner that produces occasional larger features or by adding specular reflective material such as Al flake.

FIG. 2E-1 shows an example of reflective fiber mat. Essentially, the electrospinning operation was conducted in such a manner as to produce flat, ribbon-shaped fibers. The width of many of these fibers exceeds 50 µm. The result is a material that has "gloss" and exhibits some specular reflection, as compared to the normal nanofiber structure which has no gloss and exhibits only diffuse reflection. The making of flat or ribbon fibers is described in earlier noted applications incorporated by reference, including PCT/US08/66620 "LONG PASS OPTICAL FILTER MADE FROM NANOFIBERS"; and WO 2009-140381 "POROUS AND NON-POROUS NANOSTRUCTURES AND APPLICATIONS THEREOF." In short, as described therein and with reference to the use of the electrospinning system shown here in FIG. 4 (discussed below), a polymer solution 2-10 percent (by weight) is mixed with an additive that is not volatile but that is of a high dielectric constant relative to the polymer to achieve the porosity, the dielectric constant of the additive compound in one embodiment is in the range of 50-189. In one embodiment, N-methylformamide is used as a liquid organic compound with a suitably high dielectric constant and is added to the solvent mixture with weight percentage of 1-20 wt %. Toluene is one solvent that can be used with the N-methylformamide. In one embodiment, toluene is used in the electrospinning mixture as a large weight percent of the mixture, for example in a range of the 80-99 wt %. Porous poly(methyl methacrylate) PMMA polymer nanofibers produced from these toluene/methyl formamide/PMMA are shown as an example in FIGS. 2E-2 and 2E-3. Conditions for the electrospinnning follow closely the illustrated example above except for the inclusion of the toluene, the substitution of the methyl formamide for the dimethylformamide, and the substitution of the PMMA for the polystyrene.

The average pore size obtained using this approach was seen to depend on the weight fraction of the additive in the spinning solution. This effect was demonstrated for the range of 2% and 20% (by weight) of N-methylformamide. At levels exceeding 20%, the pores were found to be too large to maintain the cylindrical shape of the nanofibers. Under these conditions, the porous fiber tended to collapse and fold into a ribbon, as shown in FIG. 2E-4.

FIG. 2E-2 shows scanning electron microscopy (SEM) images of porous PMMA nanofibers made under electrospinning conditions +20 KV, 1.0 ml/Hr, collector grounded. Concentration of the organic compounds in the solvent mixture for the samples: (a) 98% toluene, 2% N-methylformamide; (b) 95% toluene, 5% N-methylformamide; (c) 90% toluene, 10% N-methylformamide; (d) 80% toluene, 20% N-methylformamide. FIG. 2E-3 shows additional scanning electron eicroscopy (SEM) images of porous PMMA nanofibers at lower magnification made under electrospinning conditions: +20KV, 1.0 ml/Hr, collector grounded. Concentration of the organic compounds in the solvent mixture for the samples: (a) 98% toluene, 2% N-methylformamide; (b) 95% toluene, 5% N-methylformamide; (c) 90% toluene, 10% N-methylformamide; (d) 80% toluene, 20% N-methylformamide.

It is apparent that the addition of high dielectric constant compound, such as N-methylformamide, make the resultant nanofibers porous, and eventually into a ribbon shape, as compared with round, cylinder shape for smooth nanofiber prepared with a single solvent system. For nanofibers prepared with lower concentration of N-methylformamide, such as 2%-5%, instead of a perfect sphere or circular shape on the nanofiber surface, the pore structures tends to become slightly more elongated, especially along the longitudinal direction of the resultant nanofiber. When the concentration of the N-methylformamide increases 10%-20%, the round pore tends to become even more elongated along the longitudinal direction of the resultant nanofiber. When the N-methylformamide concentration reach to 20%, the pores started to merger into each other and form very rough surface features on nanofiber surface. These features can be characterized as round pores at certain experimental conditions and the existence of the threshold is clearly observed between 5% and 10% weight ratio N-methylformamide, where the pore size significantly increases and the shape becomes more elongated.

It is observed that the pores on the nanofibers range in shape from slightly elongated shapes to oval shapes and have an aspect ratio in the range of 1.1:1 to 10:1. The pores are partially embedded into the surface of the nanofiber and in some instances have an estimated depth of 5-100 nm, although smaller pore depths may not be readily detectable. The pores have an estimated length from 5-100 nm, although smaller pore lengths may not be readily detectable. The pores thus expose an interior surface of the nanofiber, providing for an increased surface area, as compared to a similar diameter nanofiber without pores. Adjacent pores can be totally separated from each other by a nanofiber wall material in between, or adjacent pores can partially overlap forming larger cavities in the nanofibers.

Examples of other high dielectric constant compounds suitable for the invention include, but are not limited to: N-Methylformamide, N-Methylacetamide, N-Methylpropanamide, N-Ethylacetamide, N-Propylpropanamide, Formamide, N-Butylacetamide, N-Ethylformamide. Their compatible solvents include but not limited to toluene, dimethylformamide, chloroform, dichloromethane, dimethylacetamide, and acetone. The polymers include but not limited to are Poly(methyl methacrylate), Poly(butyl methacrylate), Poly(Benzyl methacrylate), Poly(caprolactone), Poly (vinyl alcohol), Poly(Acrylonitrile), Poly(carbonate), and blends thereof.

The following table provides a listing of the reflectance of common materials. In one embodiment of the invention, materials of this optical type are introduced for the specular reflective material. Such materials for example can include Al, Au, Ag, $TiO_2$, ZnO, $BaSO_4$, and Zn in particle or flake form.

| Reflectance of Common Materials | |
| --- | --- |
| Polished Al | 0.60-0.70 |
| Etched Al | 0.70-0.85 |
| White Plaster | 0.90-0.92 |
| White Paint | 0.75-0.90 |
| Porcelain Enamel | 0.65-0.90 |
| White Glass | 0.75-0.80 |

In one embodiment of the invention, the addition of a nanofiber material designed to provide high reflectance can be used to increase the energy efficiency of lighting devices. The nanofiber can be used as a liner in downlights and for lighting troffers.

Thus, the reflective nanofiber mat or substrate of the invention in general provides the following embodiments:

1. Nanofiber materials lining the walls of a luminaire such as a downlight, light troffer, or other lighting device.

2. A nanofiber fiber mat or substrate including smooth, randomly oriented nanofibers with dimensions comparable to the wavelength of visible light or flat, ribbon-shaped fibers with surface pores with diameters comparable to the wavelength of light that impart of textured surface morphology.

3. A nanofiber material functioning as a diffuse (i.e., Lambertian) reflector or including features or additives that impart a gloss characteristic to the substrate. Such a substrate may exhibit both specular and diffuse reflection with the ratio of the two controlled by the relative composition of diffuse reflection sites and specular reflection sites. This structure can be fabricated in an electrospinning chamber such as shown in FIG. 4 (discussed below). Preference for a nanofiber structure that exhibits gloss or partial specular reflectance over traditional nanofiber structures (which exhibit diffuse reflectance) is provided by choice of the electrospinning parameters including, but not limited to:

1. Polymer solution concentration;
    2. Polymer solution flow rate;
    3. Electrospinning voltage gradient;
    4. Spinneret to collector distance;
    5. Spinneret size; and
    6. Spinning chamber environment;

whose parameters determine the resultant relative composition of diffuse reflective sites to specular reflective sites.

One illustrative set of parameters for use in FIG. 4 includes the following:
1) Electrospinning Solution—81% Toluene, 9% N-methylformamide, 10% Polymer (of this 10%, 85% was PMMA and 15% was PBMA);
2) Needle Gauge—25 G
3) Solution Flow Rate—0.5 mL/hr
4) $CO_2$ Flow Rate—8.0 L/min
5) Relative Humidity (RH)—78%
6) Gap Distance—7.5"
7) Voltage—26 kV
8) Total Spin Time—44 min
9) Substrate—cleaned glass slide on rectangular steel plate.

Figure 2F:
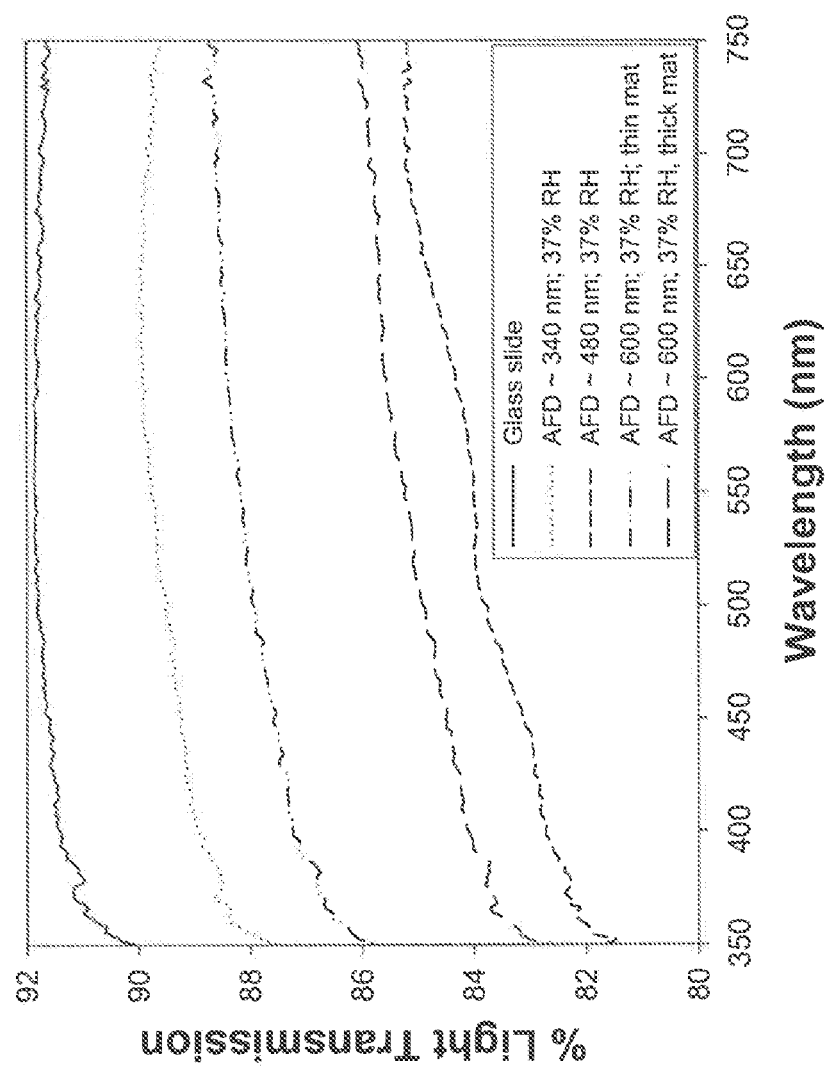
FIG. 2F is a graph showing a typical % T data observed from smooth nanofibers.

4. A nanofiber fiber mat or substrate including additives such as high dielectric constant materials (e.g., ZnO, $BaSO_4$, $TiO_2$, $Al_2O_3$, etc.) which provide additional scattering sites and increase reflectance. These additives can be dispersed into the electrospinning solution and a composite of the nanofiber and high dielectric constant material is provided directly by electrospinning operation. In one embodiment of the invention, random, textured (i.e., porous) nanofibers are the most effective for use as optical filters and wavelength selective reflectors, as discussed above. In contrast, thin layers of smooth round nanofibers have been found to be poor scatterers of lights and are not as effective for either use. Typical % T data observed from thin layers of smooth nanofibers are given in FIG. 2F. More specifically, FIG. 2F shows the percent transmission (% T) of thin layers of smooth, round PMMA nanofiber structures of differing diameters. Note the difference in transmission properties of these and the thicker smooth nylon and PMMA nanofiber structures as compared to FIG. 2B-1 and FIG. 2B-2.

More specifically, the nanofiber substrate can be coated with the high dielectric constant material using methods described in U.S. Patent Application 2008/0113214, herein incorporated by reference. In one embodiment of the invention, as discussed above, high dielectric constant materials such as for example ZnO, $BaSO_4$, $TiO_2$, $Al_2O_3$, etc can be applied to the fiber mats after electrospinning. This embodiment is illustrated in FIG. 8, below.

5. Photoactive fillers such as $TiO_2$ can be added to the nanofiber to provide continual cleaning of the nanofiber under the blue irradiation of the pump LED used in a solid-state lighting device. $TiO_2$ is a known photocatalyst and when excited by wavelengths of sufficient energy will oxidze organic compounds. The badgap of $TiO_2$ can be adjusted using known techniques such that the excitation wavelengths provided in solid-state lighting (i.e., 350 to 470 nm) are sufficient to initiate the photo-oxidation reaction. $TiO_2$ and similar photocatalytic additives can be dispersed into the electrospinning solution and a composite of the nanofiber and the photocatalytic material is provided directly by electrospinning operation. Alternatively, the nanofiber substrate can be coated with the photocatalytic material using methods described in U.S. Patent Application 2008/0113214, herein incorporated by reference.

Photoluminescent Fibers:

FIGS. 3A and 3B are schematics depicting light stimulatable fibers (LF) 2 including for example a luminescent particle 4 (i.e., one of the compounds disclosed below) disposed either on the surface or in the bulk of the nanofiber. More specifically, FIG. 3A is schematic depicting the disposition of luminescent particles 4 (e.g., light stimulatable particles such as quantum dot semiconductor materials, phosphors, or nano-phosphors) inside a volume of a fiber 2, which in FIG. 3A is depicted as a nanofiber. FIG. 3B is schematic depicting the disposition of luminescent particles 4 on or near the surface of a fiber 2, which in FIG. 3B is also depicted as a nanofiber. FIG. 3C is schematic depicting a fiber substrate 6, according to one embodiment of the invention, in which the fiber substrate 6 in total serves as an optical scattering center. In this configuration, according to one embodiment of the invention, stimulatable particles (while not explicitly shown) are disposed in association with the nanofibers 2 throughout the fiber substrate thickness h. The nanofibers 2 cumulatively provide scattering sites for excitation (or primary) light, thereby in one embodiment of the invention enhancing the probability of interaction between the pump source light and the stimulatable particles 4.

Figure 3D:
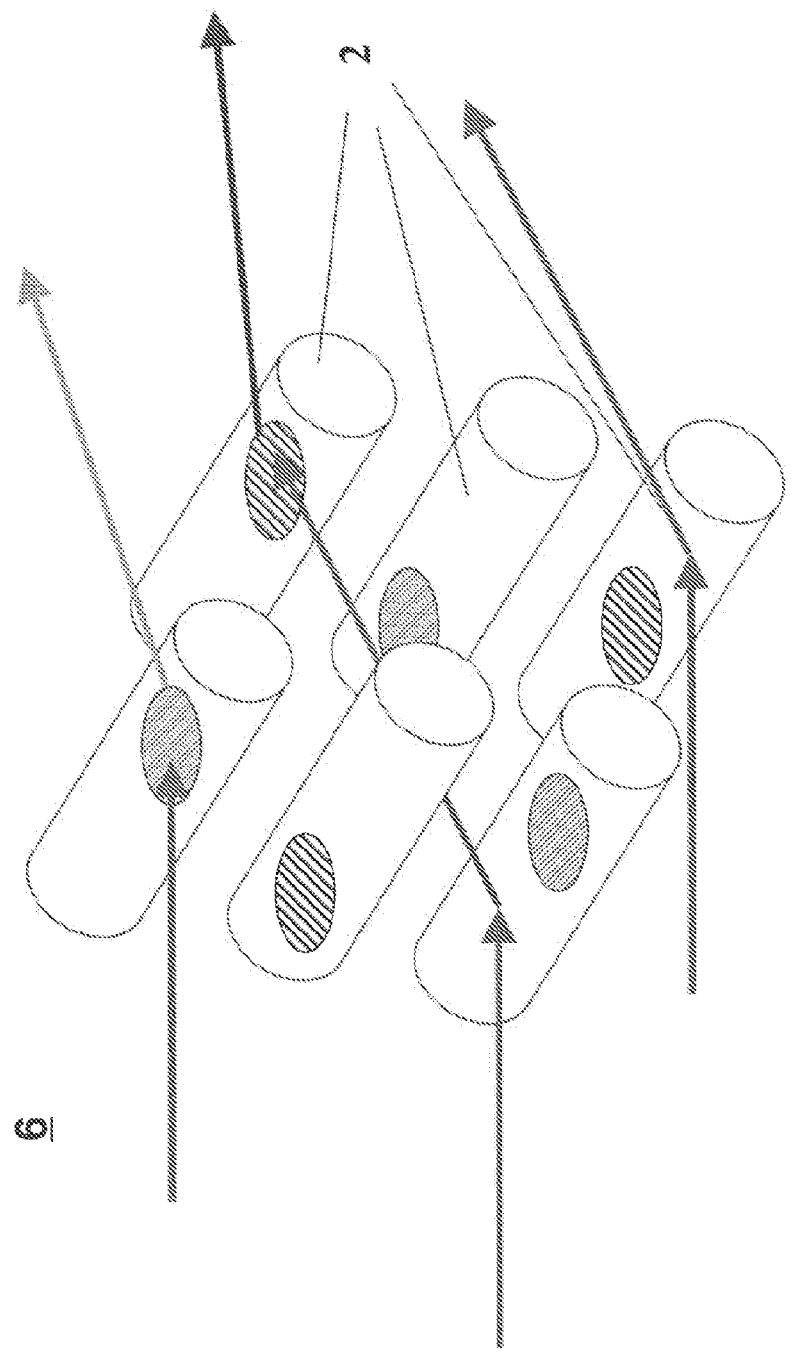
FIG. 3D is schematic depicting a fiber substrate, according to one embodiment of the invention, in which the fibers serve as individual scattering centers.

FIG. 3D is schematic depicting a fiber substrate 6, according to one embodiment of the invention, in which the fibers 2 are shown as individual scattering centers. The nanofibers 2 individually provide scattering sites for primary (or excitation) light, thereby in one embodiment of the invention enhancing the probability of interaction between the primary light and the stimulatable particles 4.

Hence, in various embodiments of the invention to be explained in greater detail below, there is provided a device including the fiber substrate shown for example in FIGS. 3C and 3D for stimulatable emission from a fiber substrate. The fiber substrate 6 includes nanofibers having an average fiber diameter in a range between 100 and 2000 nm, and plural light stimulatable particles disposed in association with the nanofibers. The stimulatable particles 4 can produce secondary light emission upon receiving primary light at a wavelength $\lambda$. The average fiber diameter is comparable in size to the wavelength $\lambda$ in order to provide scattering sites within the fiber substrate for the primary light.

As discussed later in greater detail, the average fiber diameter is in a range between 100 to 5000 nm, or more suitably between 100 nm to 2000 nm, or more suitably between 100 nm to 1000 nm. The wavelength $\lambda$ is in a range between 100 and 2000 nanometers, or more suitably between 100 and 500 nanometers. The fiber substrate 6 has a thickness in a range between 0.1 and 2,000 microns, or more suitably in a range between 1 to 500 microns.

In various embodiments of the invention, the stimulatable particles 4 include for example besides or in addition to the quantum dot materials listed above phosphors, including nano-phosphors. Phosphors such as for example in the list below and others are suitable for the invention. Examples of suitable phosphors include, but are not limited to:

1. Rare-Earth doped metal oxide such as $Y_2O_3$:Tb, $Y_2O_3$:$Eu^{3+}$, $Lu_2O_3$:$Eu^{3+}$, $CaTiO_3$:$Pr^{3+}$, CaO:$Er^{3+}$, (GdZn)O:$Eu^{3+}$; $Sr_4Al_{14}O_{25}$:$Eu^{3+}$, $GdMgB_3O_{10}$:$Ce^{3+}$:$Tb^{3+}$, $CeMgAl_{11}O_{19}$:$Ce^{3+}$:$Tb^{3+}$, $Y_2O_3$:$Eu^{3+}$;

2. Metal sulfides such as CaS:$Eu^{2+}$, $SrGa_2S_4$:Eu and $Ca_{w-x}Sr_xGa_y(S,Se)_z$:Eu 3. Rare-Earth doped yttrium aluminum garnet (YAG) such as YAG:$Ce^{3+}$;

4. Metal silicates including $Ca_3(Sc,Mg)_2Si_3O_{12}$:Ce and $(Ba,Sr)_2SiO_4$:Eu;

5. Rare-Earth doped zirconium oxide such as $ZrO_2$:$Sm^{3+}$, $ZrO_2$:$Er^{3+}$;

6. Rare-Earth doped vanadate ($YVO_4$:Eu) and phosphate $(La,Ce,Tb)PO_4$;

7. Doped materials consisting of a host matrix (e.g., $Gd_2O_3$, $GdO_2S$, PbO, ZnO, ZnS, ZnSe, Silicate) and a dopant (Eu, Tb, Tm, Cu, Al and Mn); and 8. Metal-doped forms of zinc sulfide and zinc selenide (e.g., ZnS:$Mn^{2+}$, ZnS:$Cu^+$, $Zn_{0.25}Cd_{0.75}S$:AgCl).

Other examples of phosphors for use with this invention may be found in W. M. Yen, S. Shionoya, and H. Yamamoto, Phosphor Handbook, Second Edition the entire contents of which are incorporated here by reference. Of particular utility to the invention are nanophosphors including at least one of rare-Earth doped YAG, doped metal sulfides including doped ZnS and doped $SrGa_2S_4$, doped silicates, and doped ZnSe.

Further, as discussed in more detail later, the stimulatable particles 4 can include a plurality of color-distinctive light emitters (i.e., a distribution of different sized quantum dots or a distribution of phosphors) or a combination of quantum dots and phosphors which produce respective secondary light emissions from the primary light and thereby form a resultant white light having a color rendering index greater than 70, or greater than 80.

In one embodiment of the invention, by dispersing the stimulatable particles 4 on a high surface area medium such as for example a fiber substrate of nanofibers, the emission efficiency of a fiber substrate 6 containing the nanofibers 2 and the stimulatable particles 4 (e.g., the quantum dots or phosphor) is increased above that achieved with planar packing of the luminescent particles are dispersed in a film. As a result, in one embodiment of the invention, such a nanofiber substrate structure can capture, with a higher efficiency than if the quantum dots were dispersed in a film, photons emitted by an LED and re-radiate at visible wavelengths with higher intensities than would be possible with planar packed luminescent particles.

While not limited to any particular theory, light scattered from the fibers 2 depends on the fiber diameter, light wavelength, orientation of the fiber to the light and the refractive index of the fibers. Polymers of the fibers have real refractive indices in the range between 1.3 to 1.6. Examples of the light scattering efficiency curves for long fibers of slightly absorbing materials (and which may act in a similar manner as the nanofiber structures of the invention) have been detailed previously by Van de Hulst, in Light Scattering by Small particles, Dover, 1957. In that earlier work, for an incident light of 300 nm, the maximum light scattering has a size parameter ($\pi$ times fiber diameter/wavelength) of 3.14 and a scattering efficiency (Q) of $Q_1=4.2$. For incident light at 600 nm, the size parameter is 1.6 and $Q_1=2$. Therefore, the shorter wavelength light (expected to be used frequently in the invention) is twice more likely of being trapped in the substrate of fibers than the longer wavelength light. An alternative explanation of this phenomenon is that, on average, the optical path length (OPL) of light at 400 nm through an appropriately designed nanofiber material is longer than the OPL of 600 nm light. The implications of this phenomenon as applied to the invention are that an enhancement of light emission may be obtained from the light scattering characteristics of the fibers in the fiber substrate (i.e., each fiber acting as a scattering center, and the substrate of fibers acting as a medium to more effectively confine the excitation light in the fiber substrate medium permitting a higher probability that the excitation light would interact with a light emitter during its residence in the fiber substrate.

For example, in the invention a typical excitation wavelength is blue light at 450 nm. In order to produce white light, the structure will need to emit radiation over a broad range of frequencies from 450 nm to 700 nm. By fabricating a nanofiber structure in which the average diameter of the nanofibers 4 in the substrate 6 is roughly the same as that of the excitation source (i.e., 450 nm), the excitation frequency can be effectively trapped in the nanofiber structure by light scattering (i.e., OPL of the excitation source is long). This increases the likelihood that the excitation source will initiate fluorescence and produce white light. In contrast, the longer wavelength emissions produced by fluorescence of the luminescent compound will be scattered less effectively by the nanofibers in the fiber substrate, and are more likely to emerge from the fiber substrate structure with minimal scattering. Under these conditions, the light scattering/photonic properties as a function of wavelength and fiber diameter are improved.

In one embodiment of the invention, the fiber substrate 6 includes a number of nanofibers layers (as shown in FIG. 2C). The nanofibers 2 of these layers serve individually as scattering centers for the incident excitation light. Typically, the nanofibers have an average diameter that is approximately that of the wavelength of the excitation source (i.e., from 100-1000 nm). Furthermore, the number of layers in the fiber may typically form a thickness for the fiber substrate 6 in a range of 0.1 to 2,000 microns, although thinner values such as for example 0.01 microns and thicker values such as for example 3,000 microns are suitable. The thinner layers may not be as likely to "capture" the incident excitation light, and the thicker layers may substantially scatter the induced light from the quantum dots.

Fabrication Procedures

Formation of the reflective and light stimulatable structures in the invention can occur through a number of methods. The formation methods typically involve the formation of nanofibers 2 of a controlled diameter and the application of the stimulatable particles 4 (e.g., quantum dots or phosphors) to the nanofibers 2, for stimulatable structures only. Reflective materials are fabricated by electrospinning the nanofibers and using them without the addition of other materials such as stimulatable particles. Stimulatable structures may be formed by several methods. In one method, stimulatable particles 4 can be applied to the electrospun fibers as the fibers are coalescing into a resultant fiber substrate. In one method, stimulatable particles 4 can be included in the electrospray medium. In one method, stimulatable particles 4 can be applied to the resultant fiber substrate after the substrate has been formed without any stimulatable particles. Likewise, nanofiber substrates containing high dielectric constant and/or photocatalytic materials can be made by several methods. In one method, high dielectric constant and/or photocatalytic particles 4 can be applied to the electrospun fibers as the fibers are coalescing into a resultant fiber substrate. In one method, high dielectric constant and/or photocatalytic particles 4 can be included in the electrospray medium. In one method, high dielectric constant and/or photocatalytic particles 4 can be applied to the resultant fiber substrate after the substrate has been formed without any particles.

FIG. 4 is a schematic illustration depicting an electrospinning apparatus suitable for deposition of fibers and/or nanofibers of the invention, including the deposition of fibers and/or nanofibers having particles 4 including nanoparticle light emitters such as the above-noted quantum dots and nanophosphors, particles made from high dielectric constant materials, or particles made from photocatalytic materials such as TiO2. In one embodiment of the invention, the particles 4 incorporated into the fibers and/or nanofibers of the invention are smaller than the diameter of the fibers. In one embodiment of the invention, the particles 4 incorporated into the fibers and/or nanofibers of the invention are larger than the diameter of the fibers.

In FIG. 4, an electrospinning apparatus 21 includes a chamber 22 surrounding an electrospinning element 24. As such, the electrospinning element 24 is configured to electrospin a substance from which fibers are composed to form fibers 26. The electrospinning apparatus 21 includes a collector 28 disposed from the electrospinning element 24 and configured to collect the fibers and/or nanofibers. Various methods for forming fibers and nanofibers are described in U.S. Ser. Nos. 10/819,942, 10/819,945, and 10/819,916 listed and incorporated by reference above.

The electrospinning element 24 communicates with a reservoir supply 30 containing the electrospray medium such as for example the above-noted polymer solution. The electrospray medium of the invention includes polymer solutions and/or melts known in the art for the extrusion of fibers including extrusions of nanofiber materials. Indeed, polymers and solvents suitable for the invention include for example polystyrene in dimethylformamide or toluene, polycaprolactone in dimethylformamide/methylene chloride mixture, poly(ethyleneoxide) in distilled water, poly(acrylic acid) in distilled water, poly(methyl methacrylate) PMMA in acetone, PMMA in dimethyl formamide (DMF), PMMA in N-methyl formamide (NMF), cellulose acetate in acetone, polyacrylonitrile in dimethylformamide, polylactide in dichloromethane or dimethylformamide, nylon in formic acid, nylon in acetic acid, and poly(vinyl alcohol) in distilled water and combinations thereof. In general, suitable solvents for the invention include both organic and inorganic solvents in which polymers can be dissolved. The polymer materials when formed are preferably organic materials to provide reflective substrates, although the polymers may be spun with additives that act as color filters for the luminescent compounds (as discussed in more detail later), high dielectric constant additives to increase reflectance, or photocatalytic additives to provide a measure of self-cleaning.

A high voltage source 34 is provided to maintain the electrospinning element 24 at a high voltage. The collector 28 is placed preferably 1 to 100 cm away from the tip of the electrospinning element 24. The collector 28 can be a plate or a screen. Typically, an electric field strength between 2,000 and 400,000 V/m is established by the high voltage source 34. Typically, the collector 28 is grounded, and the fibers 26 produced by electrospinning from the electrospinning elements 24 are directed by the electric field 32 toward the collector 28. The electric field 32 pulls the substance from which the fiber is to be composed as a filament or liquid jet 42 of fluid from the tip of the electrospinning element 24. A supply of the substance to each electrospinning element 24 is preferably balanced with the electric field strength responsible for extracting the substance from which the fibers are to be composed so that a droplet shape exiting the electrospinning element 24 is maintained constant. In the polymer solutions (or alternatively introduced onto the fibers after or during the electrospinning process) are either luminescent compounds, high dielectric constant materials, or photocatalytic materials. The fibers deposited in the one embodiment of the invention may range from 50 nm to several microns in diameter.

As in the related application, U.S. Ser. No. 11/130,269, previously incorporated by reference, the invention can use different electrospinning elements to generate a fiber substrate of mixed fibers of different sized fibers. The fiber substrate can have for example one side of the substrate with a larger average fiber diameter than another side of the fiber substrate.

The fibers used in the nanofibers of the invention include, but are not limited to, acrylonitrile/butadiene copolymer, cellulose, cellulose acetate, chitosan, collagen, DNA, fibrinogen, fibronectin, nylon, poly(acrylic acid), poly(chloro styrene), poly(dimethyl siloxane), poly(ether imide), poly(ether sulfone), poly(ethyl acrylate), poly(ethyl vinyl acetate), poly(ethyl-co-vinyl acetate), poly(ethylene oxide), poly(ethylene terephthalate), poly(lactic acid-co-glycolic acid), poly(methacrylic acid) salt, poly(methyl methacrylate), poly(butyl methacrylate), poly(benyl methacrylate), poly(lauryl methacrylate), polyacrylates, poly(methyl styrene), poly(styrene sulfonic acid) salt, poly(styrene sulfonyl fluoride), poly(styrene-co-acrylonitrile), poly(styrene-co-butadiene), poly(styrene-co-divinyl benzene), poly(vinyl acetate), poly(vinyl alcohol), poly(vinyl chloride), poly(vinylidene fluoride), polyacrylamide, polyacrylonitrile, polyamide, polyaniline, polybenzimidazole, polycaprolactone, polycarbonate, poly(dimethylsiloxane-co-polyethyleneoxide), poly(etheretherketone), polyethylene, polyethyleneimine, polyimide, polyisoprene, polylactide, polypropylene, polystyrene, polysulfone, polyurethane, poly(vinylpyrrolidone), proteins, SEBS copolymer, silk, and styrene/isoprene copolymer.

Additionally, nanofibers containing polymer blends can also be produced as long as the two or more polymers are soluble in a common solvent. A few examples would be: poly(vinylidene fluoride)-blend-poly(methyl methacrylate), polystyrene-blend-poly(vinylmethylether), poly(methyl methacrylate)-blend-poly(ethyleneoxide), poly(methyl methacrylate)-blend-poly(butyl methacrylate), poly(hydroxypropyl methacrylate)-blend poly(vinylpyrrolidone), poly(hydroxybutyrate)-blend-poly(ethylene oxide), poly(methyl methacrylate)-blend-poly(lauryl methacrylate), protein blend-polyethyleneoxide, polylactide-blend-polyvinylpyrrolidone, polystyrene-blend-polyester, polyester-blend-poly(hyroxyethyl methacrylate), poly(ethylene oxide)-blend poly(methyl methacrylate), poly(hydroxystyrene)-blend-poly(ethylene oxide).

Reflective Nanofiber Substrate Formation

In general, FIG. 5 is a flow chart illustrating the first above-noted method for forming a reflective nanofiber substrate (or fiber mat) according to an embodiment of the invention. At 500, a polymer solution (e.g., nylon in formic acid/acetic acid mix, PMMA in dimethyl formamide, PMMA in toluene/N-methyl formamide) is electrospun using conditions described above. At 510, from the electrospun solution, nanofibers are formed having a diameter between 100 and 5000 nm. At 520, the nanofibers are collected to form a fiber substrate after the mat has achieve sufficient thickness to produce the desired reflectance.

Particles can be added to the forming or collected nanofibers to alter the physical properties of the nanofibers. The particles may be either light stimulable, made from high dielectric constant materials, or photocatalytic. At 500, a polymer solution including particles is electrospun using conditions described above. At 510, from the electrospun solution, nanofibers are formed having a diameter between 100 and 5000 nm and including the stimulatable particles. At 520, the nanofibers are collected to form a fiber substrate. The process at 500 reflects the general techniques described above for electrospinning nanofibers preferably under controlled conditions. At 500, care is taken to sonicate the particle compounds in solvent prior to mixing with the polymer in the reservoir 30 to ensure adequate dispersion. Adequate dispersion results in a uniform distribution of the particles throughout the resultant fiber substrate. Normally, a sonication time greater than 12 hours is sufficient to obtain a uniform compound suspension in the solution. The ratio of polymer to particle compound in the solution will typically range from 1:50 to 100:1

Further, according to one embodiment of the invention, a local concentration of the stimulatable particles in the polymer solution that is too high can result in deleterious agglomeration of these compounds. FIG. 6A is a schematic of a stimulatable particle 4 (i.e., quantum dot, luminescent or light stimulatable compound) dispersion in a polymer matrix 10 at a concentration where agglomeration is at a low concentration, and typically is not a factor. FIG. 6B is a schematic of a quantum dot 4 dispersion in a polymer matrix 10 at a concentration where agglomeration is a factor. Agglomeration can become an issue even at low concentrations, since small particles often experience electrostatic attraction. However, the invention utilizes the high surface area nanofibers to reduce particle agglomeration presumable due to the ability of the high surface area nanofiber to accommodate large amounts of particles.

In one embodiment of the invention, agglomeration is undesirable since it results in non-uniformity in the dispersion of the luminescent compound in the resultant fibers. Agglomeration can change the color uniformity of the resultant light emissions. In addition, agglomeration also degrades the optical properties of the luminescent compound by causing a red-shifting of the emission frequency and a reduction of emission intensity due to self-absorption.

The size distribution of the particles can be controlled by managing a number of parameters such as for example: changing an organic phase of a solvent system, changing a temperature at which the nanoparticles are formed, alternating reactant concentrations used to form the nanoparticles, changing the capping molecule chemistry, adding surfactants to control a coagulation of the material from which the nanoparticles are to be formed, applying an electrical or magnetic field during particle nucleation, applying acoustical energy during the formation of the nanoparticles, etc.

The capping molecule chemistry can include for example forming a shell around the nanoparticle (i.e., the quantum dot) to chemically stabilize the nanoparticle. The surfactants (e.g., organic ligands) can be included around and attached to the outside of the shells to promote solution and prevent agglomeration. Such surfactants help prevent agglomeration of particles when the particles are created or used in a dry state. Alternatively, a separation method such as electrophoretic separation can be used after the particle nucleation to achieve a desired particle distribution.

At 500, the electrospinning solution can include additives such as for example organic luminescent materials (dye), ceramics, organo-metallic, carbon, and or metal. For example, the index of refraction of the nanofibers can be increased by adding a material with a high dielectric constant, such as a ceramic like $Al_2O_3$. The additives are incorporated into a polymer to impart desired physical, chemical, or mechanical properties. The additives are usually mixed with the polymer prior to electrospinning and do not generally form strong chemical bonds with the polymer. Examples of common additives found in polymers suitable for the invention include pigments (e.g., $Al_2O_3$, $BaSO_4$), conductive or reflective materials (e.g., metallic flakes), photocatalytic materials for self-cleaning (e.g., TiO2), UV stabilizers, and glass reinforcements.

At 510, the conditions in the electrospinning environment are controlled. U.S. Ser. No. 10/819,945 entitled "Electrospinning in a Controlled Gaseous Environment" describes techniques applicable to the invention for controlling the electrospraying environment. Additionally, refinements of the electrospinning process are described in U.S. application Ser. No. 10/819,916, entitled "Filter Incorporating Nanofibers," previously incorporated herein by reference. The practices described therein can be used in the invention to produce small diameter nanofibers whose large surface to volume ratio can enhance the brightness of the light emitted from the resultant fiber substrate and whose average fiber diameter size is appropriately sized to match the incident light source wavelength.

At 520, techniques in U.S. application Ser. No. 10/819,916, entitled "Electrospinning of Fibers using a Rotatable Spray Head" to obtain aligned fibers or techniques in U.S. application Ser. No. 10/819,916, entitled "Filter Incorporating Nanofibers" can be used to improve fiber mat density and uniformity.

Light Emitter Incorporation onto Nanofibers during Electrospinning

In one embodiment of the invention, as discussed above, stimulatable particles 4 can be applied to the electrospun fibers 2 as the fibers are coalescing into a resultant fiber substrate 6. FIG. 7 is a flow chart illustrating a method for forming a luminescent device according to an embodiment of the invention in which stimulatable particles 4 are attached to the electrospun fiber during the electrospinning process. At 700, a polymer solution is electrospun to form nanofibers having a diameter between 100 and 5000 nm. At 710, the nanofibers are coated during the electrospinning with stimulatable particles 4. At 720, the nanofibers are collected to form a fiber substrate 6.

In this embodiment, the stimulatable particles 4 become positioned at or near the surface of the nanofiber as shown in FIG. 2B. The process at 700 is similar to the process at 500 reflecting the general techniques described above for electrospraying nanofibers in one embodiment under controlled conditions. At 710, stimulatable particles 4 are attached onto a surface of the electrospun fibers before the electrospun fibers have dried. At 710, the stimulatable particles 4 can be introduced by an electrospray beam directed to a position removed from an electrospraying tip electrospinning the polymer solution. FIG. 4 shows an electrospray unit 48 for introducing the stimulatable particles 4 into the electrospinning environment 46.

Low agglomeration of stimulatable particles 4 can be achieved by separating the nanofiber formation and light stimulatable particle attachment steps. This can be achieved in one embodiment of the invention by introducing for example stimulatable particles 4 (such as from an electrospray solution) into a region where an emerging nanofiber is drying. In an electrospray introduction technique, submicron droplets of the stimulatable particle suspensions are generated by electrostatically disrupting a droplet of a solvent (such as for example toluene) containing the stimulatable particles. The electrosprayed droplets are highly charged (usually positively charged) and do not aggregate due to repulsion of similar charges during their passage to the surface of the polymer nanofiber 6 that, in one embodiment, can be carrying an opposing electrical charge.

Since the nanofiber is drying during ejection from the needle, in one embodiment of the invention, the location of the electrospray controls the penetration of the stimulatable particles 4 into the nanofiber 2. For example, if the electrospray beam is moved closely to the electrospraying tip, the nanofibers will likely be softer since they will contain more solvent and the stimulatable particles 4 will embed deeper into the fiber. Alternatively, if the electrospray beam is moved away from the electrospraying tip and closer to the collector, the nanofibers will be drier and the stimulatable particles will be restricted to the surface. Other parameters such as the solvent used to disperse the stimulatable particles may also influence the penetration depth of the electrosprayed stimulatable particles.

At 710, the processes described in U.S. Ser. No. 10/819,945 entitled "Electrospinning in a Controlled Gaseous Environment" for controlling the electrospraying environment to influence (retard) the drying rate of the electrospun fibers are applicable. At 710, the processes described in U.S. Ser. No. 11/130,269 entitled "Nanofiber Mats and Production Methods Thereof" with regard to the delivery and incorporation of particles into fibers are applicable to the invention.

The process at 720 is similar to the processes described above at 520.

Particle Incorporation onto Nanofibers after Electrospinning

In one embodiment of the invention, as discussed above, particles such as light stimulatable particles (e.g. example quantum dots or phosphors) can be applied to the fiber substrates after electrospinning. Other examples of particle coatings include high dielectric constant materials and photocatalytic materials such as $TiO_2$. This embodiment is illustrated in FIG. 8. According to this embodiment of the invention, a fiber substrate is formed in 800 by electrospinning methods such as for example the techniques described above. At 810, a solution containing the particles 4 is provided (such as the polymer solution in FIG. 6A). At 820, the nanofiber substrate 6 is coated with the solution. The solution is selected such that the fiber substrate does not dissolve but may slightly swell the polymers existing in the fiber substrate 6.

During the coating process, the polymer nanofibers may swell due to the solvent. This expansion of the fibers in the network also expands the spaces between the fibers, thus opening the network spaces to allow the particles to move in between. Thus, the particles may move to the fiber surface due to the Brownian motion. The fiber substrate 6 may be coated in the solution for a period of 1 minute to 72 hours and may be rinsed with a solvent for 0-60 seconds to ensure the removal of any loosely attached surface particles. The fiber substrate 6 may then be placed onto a support and allowed to completely dry under room temperature before use. The coating solution may contain additives such as polymers or tackifiers to increase the adhesion of the particles to the nanofiber.

Figure 9:
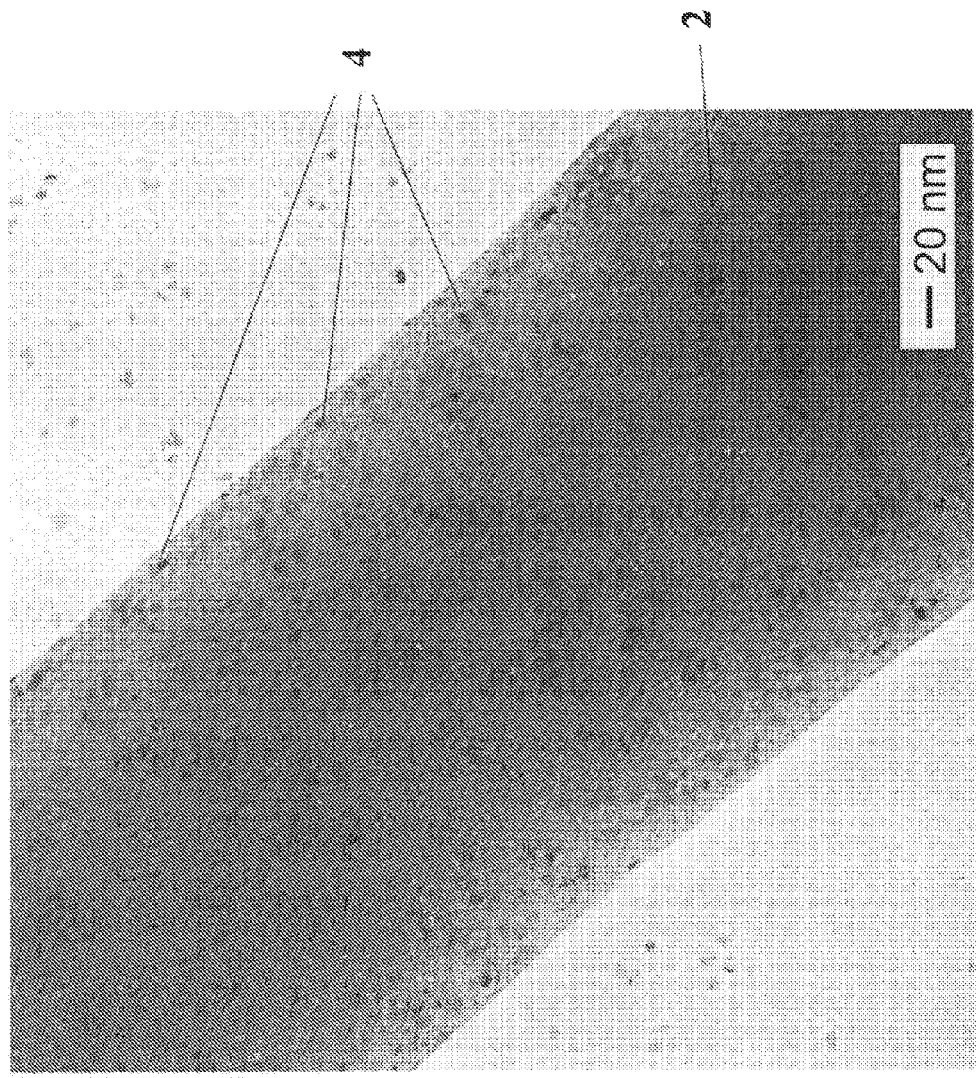
FIG. 9 is a transmission electron microscopy image of a polymer/QD composite nanofiber prepared using the method illustrated in FIG. 8.

FIG. 9 is a transmission electron microscopy image of a polymer/quantum dot composite nanofiber prepared using the method illustrated in FIG. 8. Individual quantum dots 4 are visible at both outside and inside of the fiber 2 in the transmission electron microscopic image of a decorated fiber as shown in FIG. 9. The size of the quantum dots indicates almost no aggregation of the dots.

The surface density of the particles on the polymer nanofibers made according to the method of the invention described in FIG. 8 is controllable by changing variables such as the immersion time of the fibers, particle solution concentration, number of repeated coating steps, the solvent composition, and temperature. The factors such as higher temperature that increase Brownian motion and softens the nanofiber matrix (trace solvents mixed with the non-solvent used in the process) may control both the surface coverage as well as the degree of embedment of the particles on the fiber. Based on microscopy and the mechanics of the process, the particle coating may be localized in the periphery of the nanofibers.

While particle incorporation into a matrix such as a fiber or fiber substrate described in the invention, this aspect of the invention is not so limited to electrospinning and fibers. A variety of processes, including the above-noted electrospinning, and other conventional techniques such as spray coating, drop coating, spin coating, transfer printing, thermal printing, ink-jet printing, aerosol handling, electrostatic method, extrusion of filled polymers, self-assembled monolayers, etc. can be used according to the invention to form a matrix having a predetermined distribution of luminescent or light stimulatable compounds. In those examples, the matrix need not be electrospun fibers and provides a host upon which exposure to a solvent containing a dispersion of the light emitting particles will result in the application of the particle (i.e., quantum dots, phosphors, nononphosphors, or electroluminescent particles) to the matrix. The matrix material is preferably organic-based but could include sol-gel materials containing inorganic bases.

Relative Light Emitter Distribution

In one embodiment of the invention, the luminescent compounds used to make the light stimulatable devices of the invention are particles forming for example either quantum dots, phosphors, or nano-phosphors. Quantum dots (i.e., the stimulatable particles 4) emit electromagnetic waves at wavelengths that depend, to a first approximation, on the diameter of the nanoparticles. For example, CdSe nanoparticles of 2.8 nm nominal diameter emit green light at roughly 530 nm, whereas CdSe nanoparticles of 5.0 nm nominal diameter emit red light at roughly 625 nm. The mixing of specific particles (each having a characteristic wavelength emission) can be used in the invention to produce "white light" similar to the mixing techniques used in the mixing of phosphors for fluorescent lights.

In one embodiment of the invention, the nominal sizes disclosed for the stimulatable particles can have a variance in size distribution or surface structure that results in broad-band (as compared to discrete or line emissions). For example, quantum dots of a narrow size distribution that do not contain an inorganic shell layer may exhibit broadband emission due to excitation of surface defects and traps. An example of such materials is found in Bowers et al. Journal of the American Chemical Society vol. 127 (2005) pages 15378-15379 the entire contents of which are incorporated here by reference. Likewise, broad size distributions of core shell quantum dots can be produced by controlling the parameters of the reaction used to synthesize them. The broad band emissions emulate black body radiation sources. Luminescent devices of the invention exhibiting broad band emissions have a higher color rendering index.

In one embodiment of the invention, because nanoparticles emit light having a wavelength depending on the diameter of the nanoparticles, white light may be generated from a fiber substrate having different diameter particles dispersed throughout. For example, particles having a first diameter may produce an electromagnetic wave having a first wavelength, particles having a second diameter may produce an electromagnetic wave having a second wavelength, and so on until the plurality of particles produce all the wavelengths necessary to produce a desired spectrum such as that of a blackbody radiator having a CRI approaching 100. The particles used to produce such white light may be from the same chemistry (e.g., CdSe/ZnS quantum dots) or may be from different chemistrys (e.g., combination of doped-silicate or doped-selenide phosphors with CdSe/ZnS quantum dots). In some instances, it may be necessary to physically separate the different particles in order to avoid undesired absorption of secondary emissions. This can be accomplished in one embodiment of the invention by using a substrate, such as the nanofibers described above, having strong light scattering properties for select wavelengths.

Below are examples of such mixtures determined with regard to various excitation sources:

EXAMPLE 1

Excitation Source: Blue LED at 450-460 nm

Luminescent compound: a single variety of CdSe/ZnS core shell quantum dots with particle diameter 2.6-3.2 nm (configured for yellow emission and commercially available from Evident Technologies)

Such yellow emitting quantum dots in this example are incorporated into and onto the fibers at weight percentages between 0.1% and 30% (weight quantum dots/weight fiber) with a more suitable range of weight percentage between 1% and 10% depending upon desired light output.

When packaged with the blue LED emitting at 450-460 nm, the blue light from the LED and the yellow emission from the photoluminescent fiber in this example blend to produce white light.

EXAMPLE 2

Excitation Source: Blue LED at 450-460 nm

Luminescent compound: Two different sizes of CdSe/ZnSe core shell quantum dots with the particle diameter of the first size being 2.4 nm (green emission) and the particle diameter of second size being 5.2 nm (red emission) (purchased from Evident Technologies).

These two sizes of luminescent quantum dots are incorporated into and onto the fibers at weight percentages between 0.1% and 30% (total weight quantum dots/weight fiber) with a more suitable range of weight percentage between 1% and 10%. The ratio of green particles to red particles incorporated into and on the fibers varies between 1:1 to 20:1 depending upon desired light output. In order to prevent undesired absorption of secondary emissions, it may be preferable to physically separate the two sizes of luminescent quantum dots. This can be achieved in one embodiment of the invention by locating the quantum dots on separate sides of the fiber substrate or by placing the quantum dots in different zones or pixels on the same side of the fiber substrate.

When packaged with a blue LED emitting at 450-460 nm, the blue light from the LED and the green and yellow emission from the photoluminescent fiber in this example blend to produce white light.

EXAMPLE 3

Excitation Source: Violet LED at 408 nm

Luminescent compound: Three different sizes of CdSe/ZnSe core shell quantum dots with the particle diameter of the first size being 1.9 nm (blue emission), the particle diameter of the second size being 2.4 nm (green emission), and the particle diameter of third size being 5.2 nm (red emission) (purchased from Evident Technologies).

These three sizes of luminescent quantum dots are incorporated into and onto the fibers at weight percentages between 0.1% and 100% (total weight quantum dots/weight fiber) with a more suitable range of weight percentage between 1% and 50%. The ratio of blue particles to green particles to red particles incorporated into and on the fibers is chosen to produce light emissions with relative intensities between 1:2:3 (for "warm white" color) to 2.5:1.5:1 (for "cool white" color) depending upon desired light output. In order to prevent undesired absorption of secondary emissions, it may be preferable to physically separate the three sizes of luminescent quantum dots. This can be achieved by locating the quantum dots on separate sides of the fiber substrate or by placing the quantum dots in different zones or pixels on the same side of the fiber substrate.

When packaged with a violet emitting LED at 408 nm, white light is produced in this example by blending the emission of blue, red, and green colors by the photoluminescent nanofiber. Little to no visible radiation from the LED contributes directly to the white light product.

EXAMPLE 4

Excitation Source: UV LED at 350-370 nm

Luminescent compound: Three different sizes of CdSe/ZnSe core shell quantum dots with the particle diameter of the first size being 1.9 nm (blue emission), the particle diameter of the second size being 2.4 nm (green emission), and the particle diameter of third size being 5.2 nm (red emission) (purchased from Evident Technologies,45 Ferry Street Troy, N.Y. 12180).

These three sizes of luminescent quantum dots are incorporated into and onto the fibers at weight percentages between 0.1% and 100% (total weight quantum dots/weight fiber) with a more suitable range of weight percentage between 1% and 50%. The ratio of blue particles to green particles to red particles incorporated into and on the fibers is chosen to produce light emissions with relative intensities between 1:2:3 (for "warm white" color) to 2.5:1.5:1 (for "cool white" color). In order to prevent undesired absorption of secondary emissions, it may be preferable to physically separate the three sizes of luminescent quantum dots. This can be achieved in one embodiment of the invention by locating the quantum dots of different sizes on separate sides of the fiber substrate or by placing these quantum dots in different zones or pixels on the same side of the fiber substrate.

When packaged with a UV emitting LED at 350-370 nm, white light is produced by the blending of emissions of the blue, red, and green colors by the photoluminescent nanofiber.

EXAMPLE 5

Excitation Source: Blue LED at 450-470 nm

Luminescent compound: Green phosphors such as the sulfoselenide compositions sold by PhosphorTech [Lithia Springs, Ga.] can be applied to an uncoated nanofiber using the coating processes of drop coating, ink-jet printing, spray coating, dip coating, or similar methods. Added to this composite were red emitting quantum dots using processes such as ink-jet printing, spray coating, dip coating, or drop coating. When this construct is packaged with a blue emitting LED at 450 to 470 nm, white light is produced in this example by blending the emissions of the green phosphor, red quantum dot, and blue LED.

EXAMPLE 6

Excitation Source: Blue LED at 450-470 nm

Luminescent compound: Green phosphors such as the doped silicate compositions sold by Intematix [Freemon, Calif.] can be applied to an uncoated nanofiber using the coating processes of drop coating, ink-jet printing, spray coating, dip coating, or similar methods. When this construct is packaged with a blue emitting LED at 450 to 470 nm and a red-orange emitting LED at 610 nm, white light is produced in this example by blending the emissions of the green phosphor, red-orange LED, and blue LED.

EXAMPLE 7

Excitation Source: Blue LED at 450-470 nm

Luminescent compound: Green phosphors such as the doped silicate compositions sold by Intematix [Freemon, Calif.] can be applied to an uncoated nanofiber using the coating processes of drop coating, ink-jet printing, spray coating, dip coating, or similar methods. Added to this composite were red emitting quantum dots using processes such as ink-jet printing, spray coating, dip coating, drop coating, or similar methods. When this construct is packaged with a blue emitting LED at 450 to 470 nm, white light is produced in this example by blending the emissions of the green phosphor, red quantum dot, and blue LED.

EXAMPLE 8

Excitation Source: Cool White LED at 450-750 nm

Luminescent compound: Red-orange emitting quantum dots of diameter of approximately 5.2 nm (purchased from Evident Technologies,45 Ferry Street Troy, N.Y. 12180) can be applied to an uncoated nanofiber using the coating processes of drop coating, ink-jet printing, spray coating, dip coating, or similar methods. When this construct is packaged with a cool white emitting LED (CCT>4,500 K) radiating at 450 to 750 nm, warm white light (CCT<3,300 K) with improved color rendering index is produced in this example by blending the emissions of the cool white LED and red quantum dots.

Luminescent Devices

Figure 10:
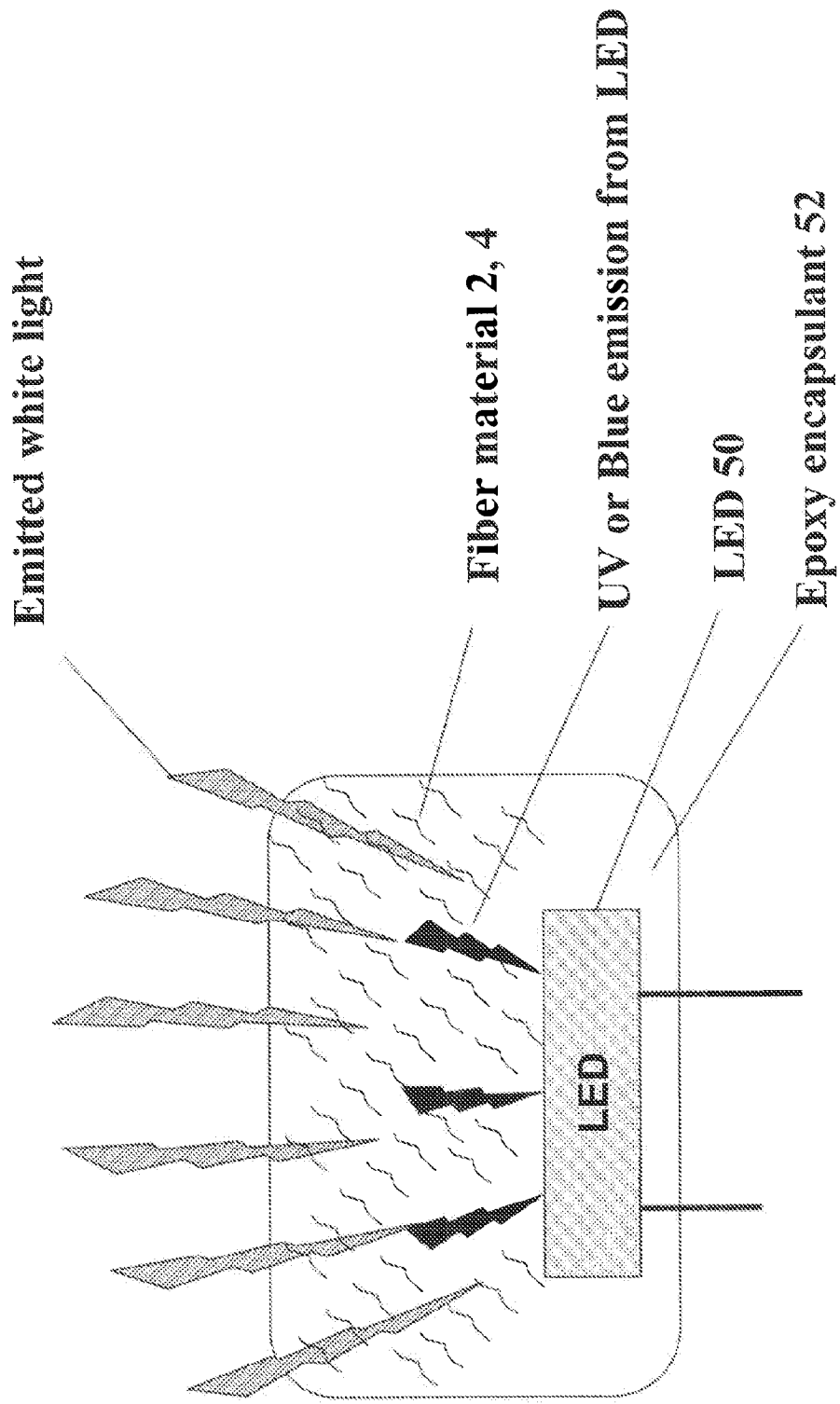
FIG. 10 is a schematic depicting according to one embodiment of the invention a configuration in which a light emitting diode (LED) couples light through an encapsulant to the fibers including the luminescent materials.
Figure 11:
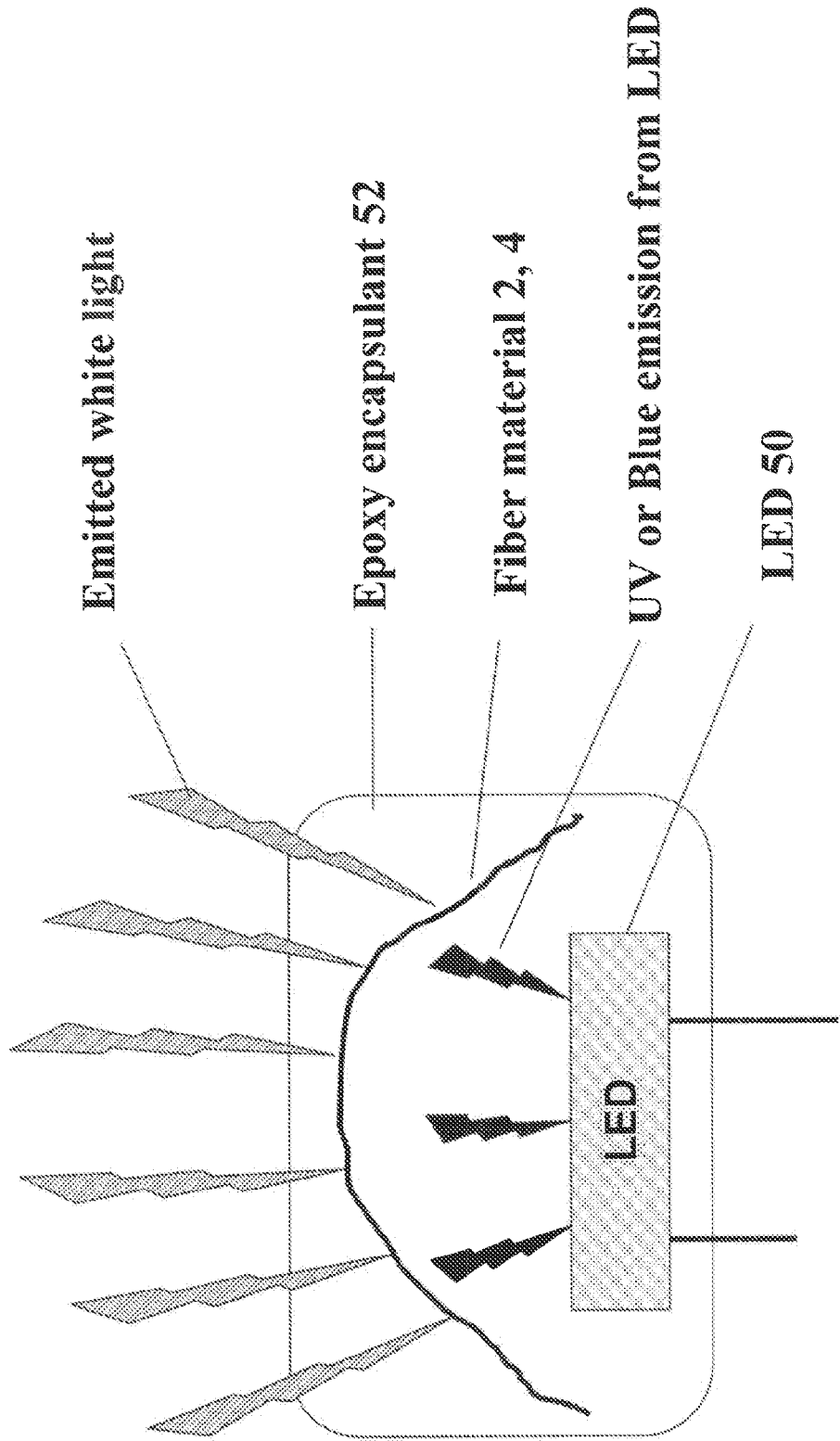
FIG. 11 is a schematic depicting according to one embodiment of the invention a configuration in which a light emitting diode (LED) couples light through an encapsulant containing therein fibers including the luminescent materials.

In one embodiment of the invention, a polymeric substrate such as an electrospun fiber substrate including luminescent materials is included in an encapsulant such as for example an epoxy matrix. FIG. 10 is a schematic depicting according to one embodiment of the invention a configuration in which a light emitting diode (LED) couples light through an encapsulant to the fibers including the luminescent or light stimulatable particles. More specifically, FIG. 11 shows LED 50 emitting UV or blue light through a nanofiber materials 2, 4 having a certain distribution of stimulatable particles such as quantum dots (not shown). The UV or blue light emitted by LED 50 constitutes the incident light for the nanofiber materials 2, 4. The stimulatable particles 4 (e.g., the phosphors or quantum dots) absorb the incident light, and depending on their properties, emit white light. The fiber substrate materials 2, 4 are encapsulated, for example, in an epoxy or silicone encapsulant 52. The epoxy 52 may encapsulate both the LED 50 and the fiber substrate materials 2, 4, either completely or partially. The fiber substrate materials 2, 4 may include quantum dots of sizes varying from approximately 1.5 nm to 10 nm or one or more phosphors to produce a light emission across the desired portion of the visible spectrum. The concentration of various stimulatable particles is controlled, in one embodiment of the invention, to provide high quality white light similar to solar emissions.

In other examples, a higher concentration of red emitters than blue emitters may be chosen for other non-white light applications. Thus, the invention permits both monochromatic and color-distinctive luminescent structures to be made by the respective placement of the appropriate luminescent particle in respective areas of the luminescent structure. Prefabricated polymer substrates including nanofiber substrates of respective emission colors (i.e., white, red, blue, green, or a color combination) can be cut and placed in the respective areas, such that a common light source coupled for example through a fiber optic cable would produce different light from the respective areas.

According to another embodiment of the invention, the substrate may be directly placed on the surface of the LED 50 before the encapsulation with epoxy. This placement may reduce energy losses from absorption of some wavelengths (e.g., blue or UV) in the epoxy. Stimulatable particles 4 such as the quantum dots may be concentrated near the LED for a maximum absorbing effect. Further as part of the bonding of the nanofiber substrate to the LED, interstices in the fibers may be filled with a low refractive index polymer, such as silicone, to optimize the scattering effects required to trap the UV light.

FIG. 10 is a schematic depicting according to one embodiment of the invention a configuration in which a light emitting diode (LED) 50 couples light through an encapsulant 52 containing therein fibers 2 including the stimulatable particles 4. In this embodiment, as shown in FIG. 10, the nanofiber substrate including the stimulatable particles 4 has been divided (e.g. chopped) and added as filler to the epoxy encapsulant 52, for example an encapsulant typically used in LEDs. An alternative approach is to disperse the fibers by shear of the epoxy. Because the nanofibers may be made small to not interfere with the visible light transparency of the clear epoxy, the optical properties of the epoxy should be unaffected.

Some advantages of the various embodiments of the invention as compared to the traditional technology include: 1) providing a luminescent material with broad spectral emission can be created by incorporating a distribution of particles into the light stimulatable devices of the invention; 2) creating such a structure requires less solvent than the casting or electrophoretic methods currently in use for phosphors; 3) allows emission, transmission, and scattering properties of the luminescent material to be controlled separately through a choice of the particle (i.e., particle density, size, composition, etc.) and nanofiber geometry (i.e., length, diameter, etc.); 4) allows for more efficient operation of the photoluminescent converter due to higher surface area and control of the fiber geometry; and 5) provides a more convenient process to handle and process nanoparticles in finished devices than alternative approaches.

Lighting Devices

A lighting device of the invention includes a reflector (e.g., a mat of reflective fibers as discussed above) and a source of primary radiation. This lighting device can be used by itself as a luminaire (i.e., lighting fixture) or in some cases can be used as a lamp that is contained in a luminaire. The reflector configuration including the mechanism for providing primary radiation and the mechanism for supporting reflective nanofiber sheets provides for efficiently directing the light emanating from the lighting device. The reflective nanofiber material used in this device is configured to provide a structure that takes advantage of the light scatter from the thick nanofiber substrate to provide a high (>0.80) reflectance as described above. The nanofiber substrate can be made from a variety of polymers including but not limited to polyamides, polyacrylates, poly(methyl methacrylate), and poly(butyl methacrylate). The appropriate level of reflection is produced by providing a material containing discontinuities in the dielectric constant produced by either 1) a large macropore structure created by the void volume between adjacent fibers, 2) a macropore structure created by the introduction of pores onto the surface of the nanofiber, and/or 3) the addition of high dielectric constant materials to the nanofiber.

In an additional embodiment, the source of primary radiation impinging upon a reflective nanofiber is provided by a photoluminescent nanofiber made by combining luminescent particles and nanofibers. In this embodiment, there exists a mechanism for excitation illumination, and a mechanism for supporting luminescent sheets (formed from the luminescent particle/fiber composites described above). This lighting device can be used by itself as a luminaire (i.e., lighting fixture) or in some cases can be used as a lamp that is contained in a luminaire. The reflector configuration including the mechanism for exciting illumination and the mechanism for supporting luminescent sheets provides for efficient light conversion and emission from the luminescent particle/polymer composites described above. The reflector configuration of the invention is configured to accommodate the light-conversion material in a structure taking advantage of the light scatter from the nanoparticle/nanofiber composites described above. Light produced by the luminescent sheets strikes the reflective nanofibers and to directed toward the output of the lighting device. The high reflectance of the reflective nanofibers results in a high optical power emanating from the device than would occur in the absence of the reflective nanofiber.

As described above, the luminescent particle/polymer fiber composites include luminescent nanoparticles supported by organic nanofibers. The aspect of the invention permits the luminescent nanoparticles to effectively be suspended in air by the nanofibers. Most light-conversion phosphors in conventional white-light LEDs (light emitting diodes) are held within a solid material having a significant index of refraction, and various strategies are used with these materials to overcome total internal reflection and to extract the light efficiently from the solid material. The luminescent particle/polymer composites, including nanoparticle/nanofiber composites, (hereinafter referred to as "the luminescent sheet") described above do not suffer from total internal reflection.

In one embodiment of the invention, light conversion is to accept short-wavelength light and to convert the short-wavelength light to longer wavelengths. The combination of an LED producing short-wavelength light (for example, blue light) and an appropriate light-conversion mechanism (for example, one producing yellow light) provides an efficient way of producing white light for general illumination. In one embodiment of the invention, a range of incident (excitation) wavelengths are used which provide excitation (for example, light ranging from blue to ultraviolet). In one embodiment of the invention, the light-conversion mechanism of the particles emits a single color in response to the excitation light. In one embodiment of the invention, the light-conversion mechanism of the particles emits a broad band of wavelengths representing a wide range of colors (for example, from blue to red).

In one embodiment of the invention, the light-conversion material is relatively thick or reflective, so that the excitation light will not pass through the luminescent sheet in a significant amount, but is instead reflected to a high degree. A value of less than 70% transmittance in general would make the light-conversion material an optically thick material. Such an optically thick material is provided by a nanofiber substrate with a thickness in excess of 50 µm. Under this condition, the luminaire in this embodiment of the invention is arranged so that both sides of the luminescent sheet are illuminated by the excitation light, and emitted light is collected from both sides of the luminescent sheet for emanating from the luminaire.

In one embodiment of the invention, illumination from the excitation light source does not directly escape the luminaire. Accordingly, any light escaping the luminaire in this embodiment includes both 1) a component of the excitation light has been scattered from a matrix of the luminescent sheets without a change in wavelength (for example, blue light) and 2) emitted light produced by active luminescent particles (for example light having a longer wavelength than the excitation light such as yellow light).

Figure 12:
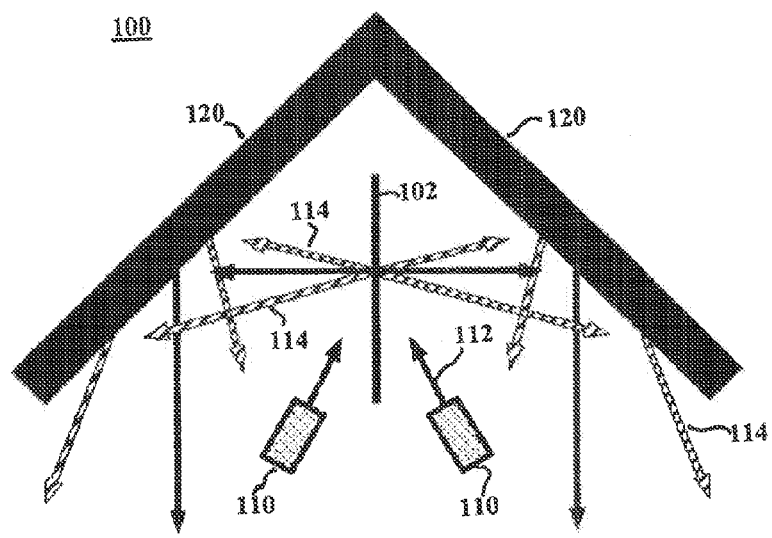
FIG. 12 is a cross-sectional depiction of a luminaire structure according to one embodiment of the invention.

As shown in FIG. 12, light sources 110 (producing the excitation light) produce light that is directed away from the exit of the luminaire shown at the bottom of the luminaire.

FIG. 12 is a cross-sectional depiction of a luminaire structure 100 according to one embodiment of the invention. The vertical center line depicts a luminescent sheet 102. Light sources 110 (e.g., light emitting diodes LEDs or other light sources) produce excitation light 112 which is directed to the luminescent sheets 102. In other embodiments, one or more separate (or integrated) excitation light sources 110 can be provided for each side of the luminescent sheet 102. Luminescent particles in the luminescent sheets 102 upon interaction with the primary light (i.e., excitation light 112) emit secondary light at a wide range of wavelengths, as discussed above in the "Relative Light Emitter Distribution" section. A reflector 120 containing reflective nanofiber made as described above reflects light back toward the luminescent sheet 102. The reflector 120 also reflects some light out of the luminaire 100. Excitation light 112 (for example, blue light) thus impinges on the luminescent sheet(s) 102 from multiple angles and impinges on the luminescent sheet(s) 102 on both sides. Some of the excitation light 112 scatters from the luminescent sheet 102 and exits the luminaire 100 at the bottom of the luminaire either directly or by reflection from the reflector 120. Emitted light 114 (for example, yellow light) created in the luminescent sheet can also exit the luminaire 100 at the bottom of the luminaire and can mix with the scattered excitation light 112.

FIG. 12 shows the excitation light 112 incident on the luminescent sheet 102 at a steep oblique angle, which in one embodiment maximizes the interaction of the excitation light with the luminescent sheet 102. The incident angle is a design variable which can be adjusted in the configuration of the luminaire 100 for maximum efficiency depending on the properties of the luminescent sheet 102. In general, the oblique angle varies from an angle of 15° to 85° to a normal to the luminescent sheet. In one embodiment of the invention, the luminescent sheet 102 is shown in a location separated from the reflector 120, allowing emitted light to reflect around the sheet. In general, the position of the luminescent sheet is set to a position for maximum efficiency. Efficiency in this context referring to the ratio of the amount of light produced by the luminaire (integrated over all directions, for example in an integrating sphere) to the power used to operate the luminaire.

Accordingly, in one or more embodiments of the invention, luminare 100 includes a source of excitation light (for example, blue LEDs), a luminescent sheet (for example, one that converts blue light to yellow light), and a nanofiber reflector that directs the scattered light. Light can be directed from the excitation sources obliquely toward the luminescent sheet. The angle between the excitation source and the luminescent sheet is set to a value having the greatest efficiency. Efficiency in this context also referring to the ratio of the amount of light produced by the luminaire (integrated over all directions, for example in an integrating sphere) to the power used to operate the luminaire. The luminescent sheet 102 shown in FIG. 12 is located at a distance from the excitation source 110 and from the reflector 120. The reflector 120 is arranged to reflect light from the scattered and emitted light in a useful direction. While FIG. 12 shows a reflector 120 having two reflective nanofiber surfaces held at a right angle, in other embodiments, the reflector 120 can also be curved surface rather than planar surface, can include facets or surface features, and can be related by angles different from right angles.

In an alternative embodiment to that shown in FIG. 12, the excitation light source and luminescent sheets are replaced by a primary light source of desired spectral properties. Light emitted by the primary light source strikes the nanofiber reflector and is directed to the exist of the lighting device by the highly reflective nature of the nanofiber reflector.

Figure 13:
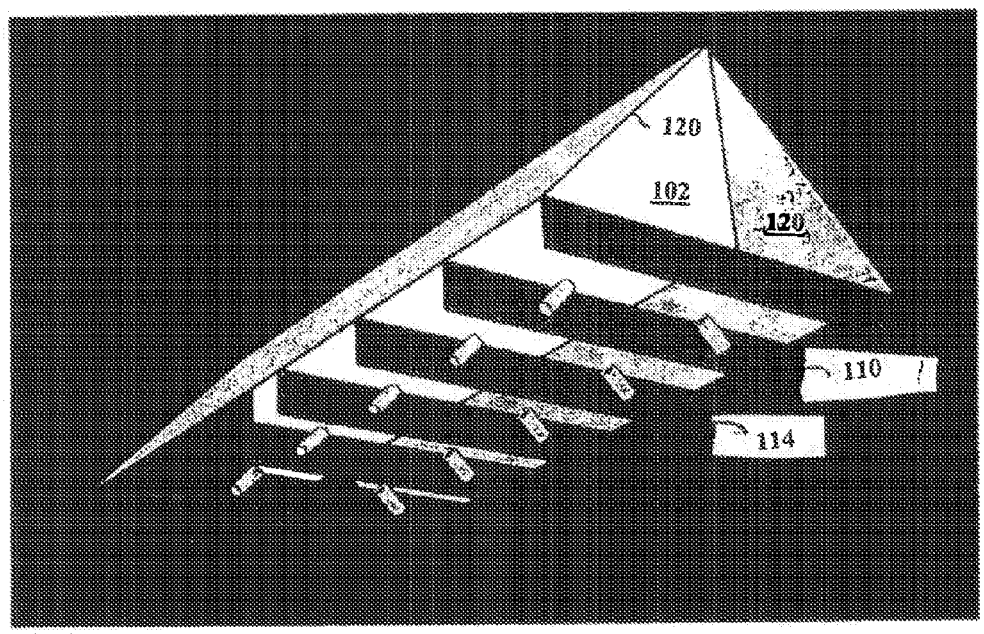
FIG. 13 is a perspective depiction of a similar luminaire structure according to one embodiment of the invention.

One example of another luminaire 150 according to the invention is shown in FIG. 13. In this luminaire, blue light (scattered from the luminescent sheet 102) and yellow light (emitted from the luminescent sheet) are mixed to form white-appearing light. For decorative purposes, the mix of luminescent particles can be altered to provide specific colors of illumination. The shape and size of the luminescent sheet 102 and the shapes and sizes of associated nanofiber reflectors can be altered to provide new design elements for decorative or architectural purposes. Luminescent sheets 102 of various kinds can be arranged to be easily substituted for each other, allowing color or shape to be changed conveniently and inexpensively by the user of the luminaire 100 or 150.

In an alternative embodiment to that shown in FIG. 13, the excitation light source and luminescent sheets are replaced by a primary light source of desired spectral properties. Light emitted by the primary light source strikes the nanofiber reflector and is directed to the exist of the lighting device by the highly reflective nature of the nanofiber reflector.

More specifically, FIG. 13 is a schematic depiction of luminaire 150 according to one embodiment of the invention. The view in FIG. 13 is from underneath the luminaire looking upward toward the planar nanofiber reflectors 120. The vertical plane in the middle of luminaire 150 depicts luminescent sheet(s) 102 that converts a part of the excitation light from light sources 110 to secondary, emitted light. Cross-members 114 on the lower part of the luminaire 150 hold light sources 110 for producing the excitation light. The reflectors 120 (i.e., the nanofiber reflector substrates) direct light out the bottom of luminaire 150.

Figures 14A, 14B:
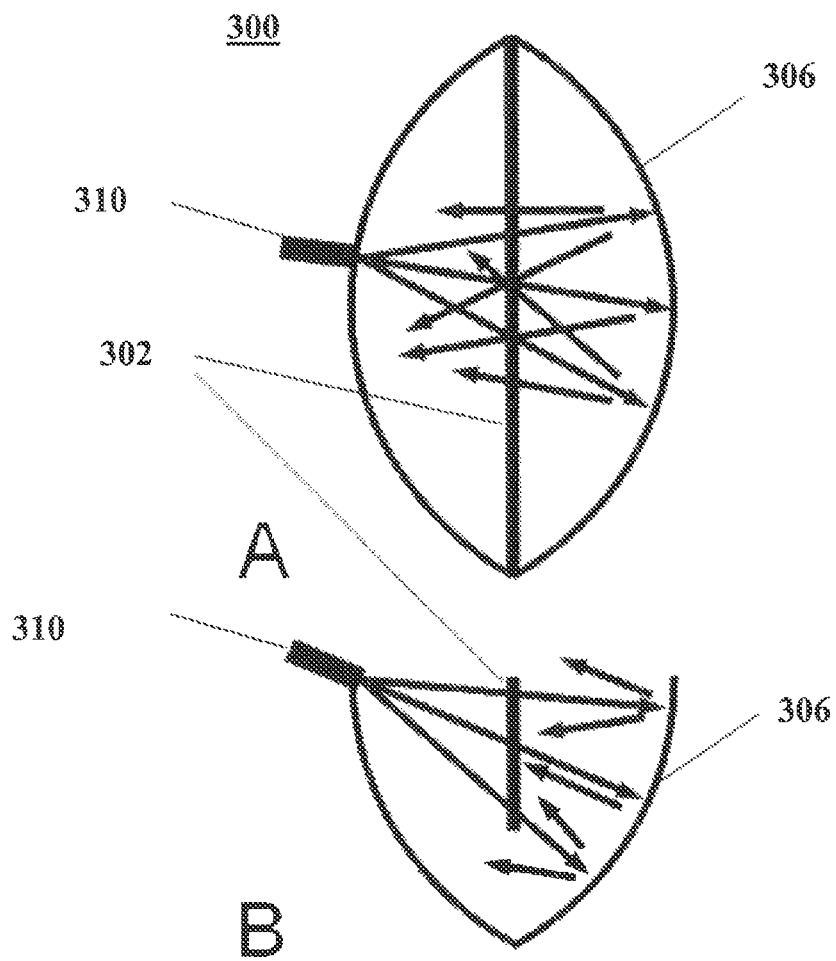
FIG. 14 is a depiction of another light emitting structure according to one embodiment of the invention, from different perspective views.
Figures 14C, 14D:
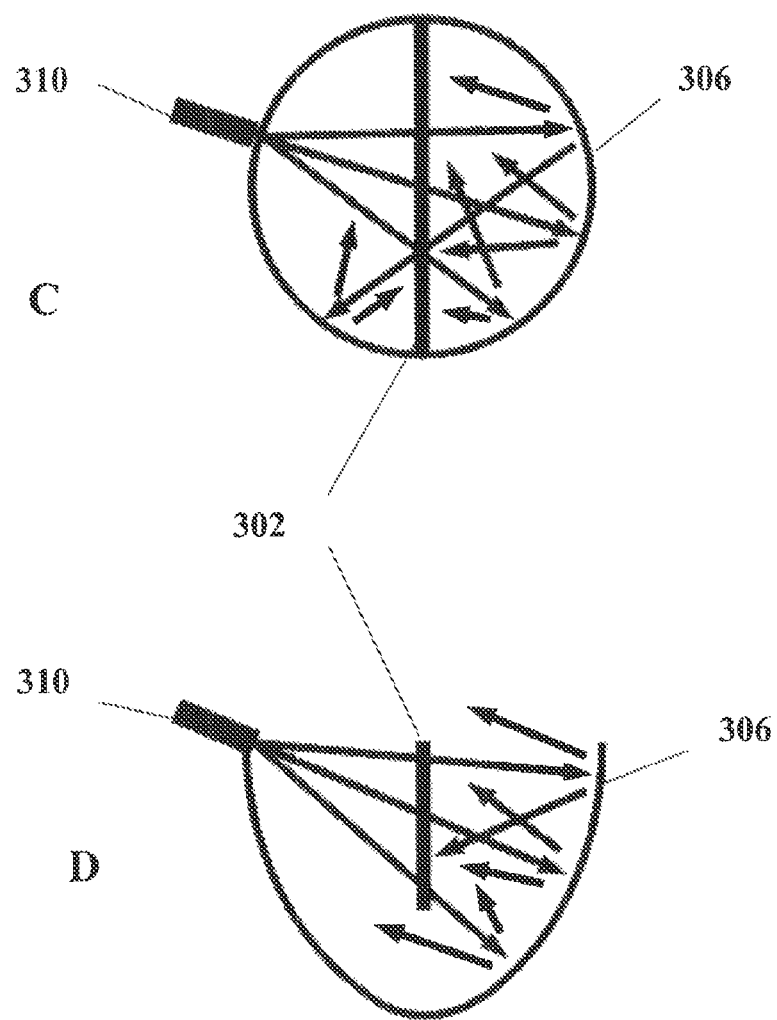

FIG. 14 is a depiction of another light emitting structure 300 according to one embodiment of the invention, from different perspective views. FIG. 14A shows a top view of structure 300 whose outline includes segments of a full circle. A light source 310 such as for example an LED provides excitation illumination for the light-conversion material 302, located in this embodiment in the center of structure 300. Excitation light is transmitted through the light-conversion material 302 and reflected by the nanofiber reflector structure 306. The nanofiber reflector could be used by itself (e.g., a formed sheet of nanofiber material) or laminated to a backing layer (e.g., metal, glass, paper such as PolyArt, etc.) to provide mechanical support. Unscattered excitation light is indicated by solid arrows. FIG. 14B is a side view of the structure 300, also showing an outline including segments of a circle. FIG. 14C is a top view of structure 300, showing the emission and scattering of light from the light-conversion material 302. Excitation light incident onto the luminescent sheet is not shown. Excitation light scattered from the matrix of the luminescent sheet without change of wavelength is indicated by solid arrows. Secondarily emitted light, having one or more wavelengths that are longer than that of the excitation light, is indicated by dashed arrows. While FIG. 14B illustrates unscattered excitation light, FIG. 14D illustrates scattered excitation light (indicated by solid arrows) and secondarily emitted light (dashed arrows). Depending on the composition of the luminescent material, the secondarily emitted light may have one wavelength or several wavelengths. In this part of structure 300, only light emitted from the right side of the light-conversion material 302 is shown, in order to illustrate more clearly the additional path for reflection of light underneath the light-conversion material 302.

In this embodiment, the outline of the top view of structure 300 is a full circle, and the light source 310 is not located at its center. In this configuration, some light is still scattered back toward the light-conversion material 302 and the opposite reflector surface 306. In the perpendicular plane (FIG. 14B), the light source 310 is in the center of the circle forming part of the side of structure 300, which is intended to optimize reflection back toward the light conversion material.

Figure 15:
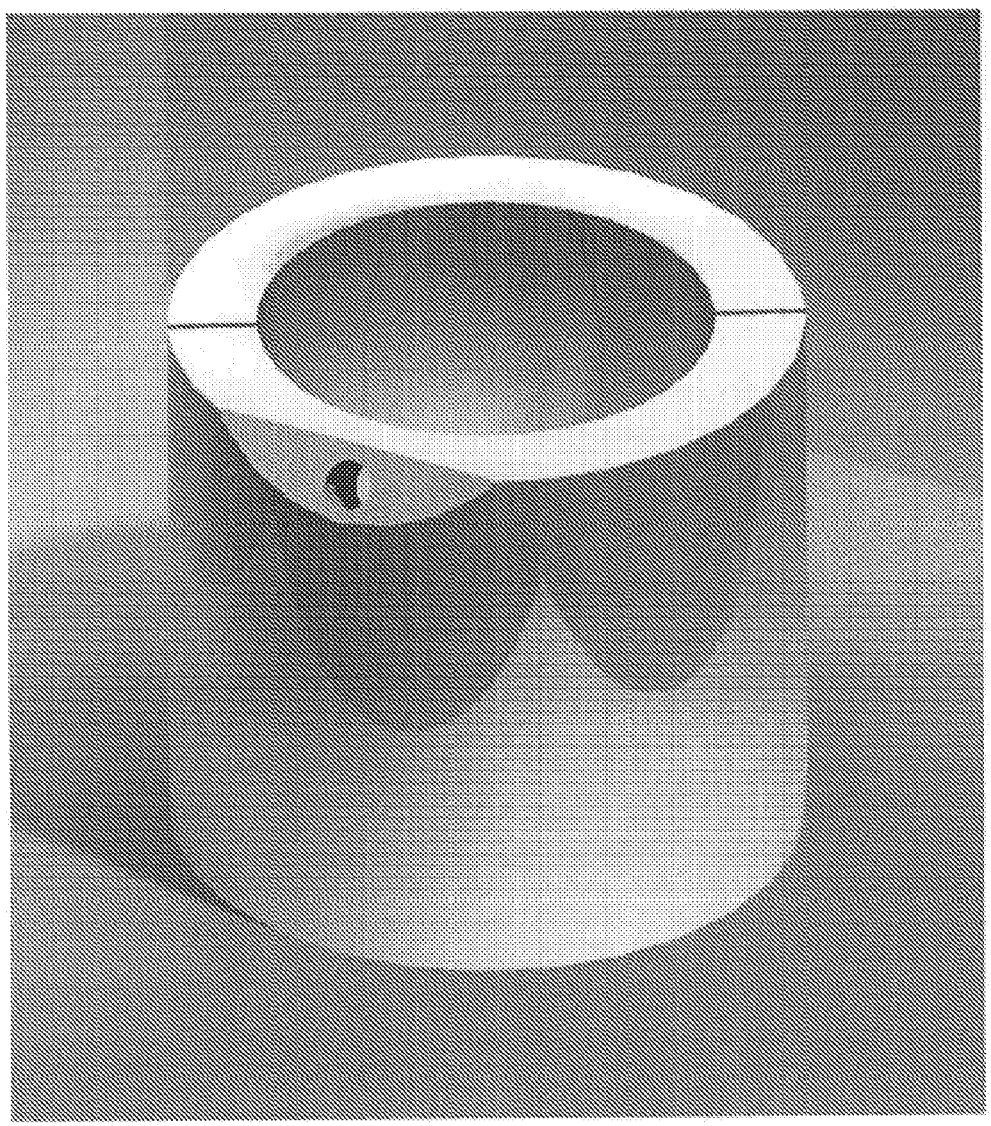
FIG. 15 is a computer generated three-dimensional depiction of the reflector in FIG. 14.

A model of reflector 300 is shown in FIG. 15. The hole in the upper front rim is configured to hold a LED for producing the excitation light. The slot on the top surface is configured to hold the light-conversion material 302.

Figure 16:
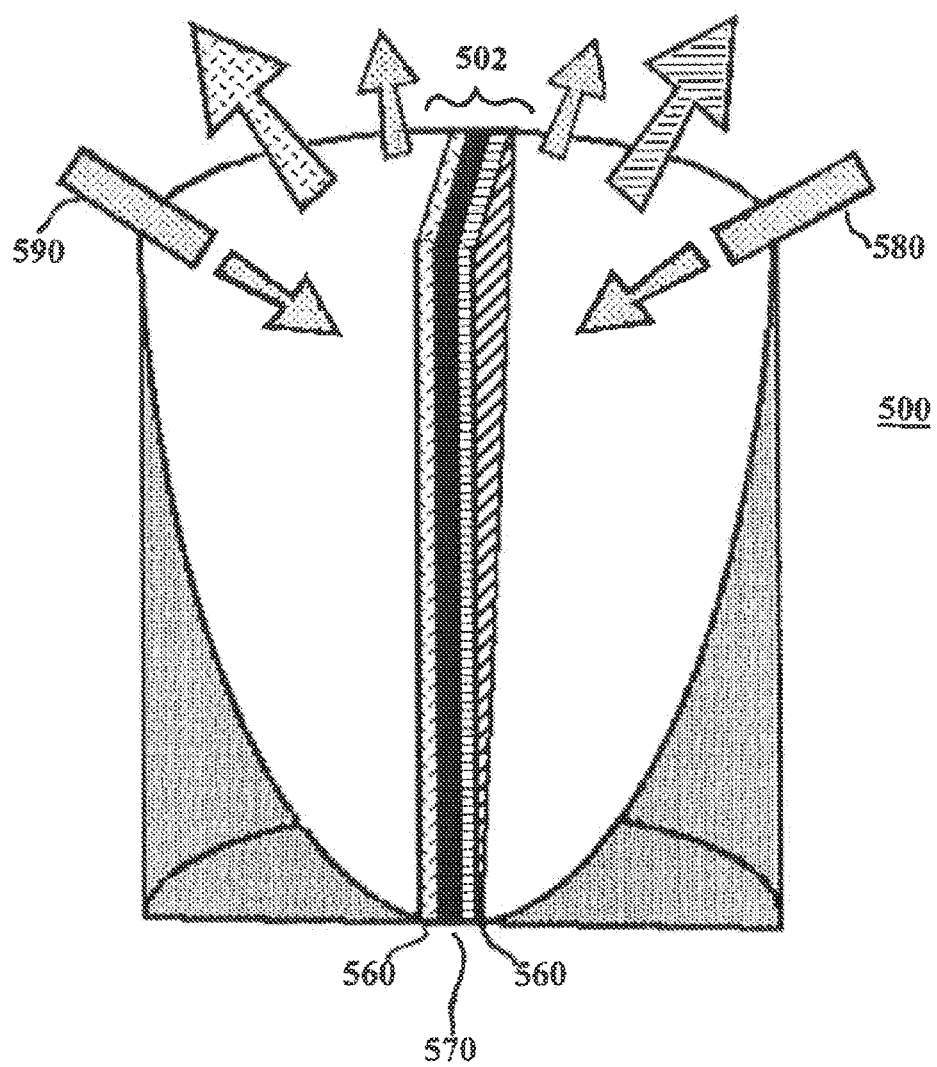
FIG. 16 is a depiction of another light emitting structure according to one embodiment of the invention.

Remote Phosphor Reflector Block:

A remote phosphor reflector block (RPRB) embodiment of the invention provides another mechanism for incorporating the light conversion materials discussed above. FIG. 16 is a depiction of a RPRB according to one embodiment of the invention.

In the RPRB embodiment, light-conversion material 502 is relatively thick or otherwise substantially diffusely reflective. Such a reflective conversion material does not permit substantial light to be transmitted through light-conversion material 502. Therefore, this material provides a mechanism to separate light of different colors in different compartments. Separation of colors of light is a benefit when mixed light converters are to be used. For example, light emitting structure 500 can include both a green converter layer 550 and a red converter layer 560 which both can interact with blue excitation light. Mixed converters 550, 560 (e.g., green and red) can be arranged to provide a wider color gamut or better color rendering quality than a single converter layer (such as for example a single yellow layer). In this regard, mixed converters can be advantageous. However, with mixed converters, it may happen that blue light is intercepted by a green converter, which emits green light, and the emitted green light can in turn be intercepted by a red converter which emits red light. Multiple conversions like this reduce the efficiency of light production. Efficiency in this context also referring to the ratio of the amount of light produced by the luminaire (integrated over all directions, for example in an integrating sphere) to the power used to operate the luminaire. It should be noted that, for the same power input to the structure 500, multiple conversions of light colors produce less total light than single conversions To address this inefficiency, this embodiment of the invention segregates areas of different color conversion layers into different regions using reflective barriers 570.

As before, for a balance of white light, illumination from the excitation light source should not directly escape the RPRB luminaire structure. Light escaping the luminaire structure should include excitation light scattered from the matrix of the light-conversion material without a change in wavelength (for example, blue light) combined with emitted light produced by the active luminescent particles that has a longer wavelength than the excitation light (for e.g., example, red and green light).

In the RPRB embodiment, a concave reflector made from reflective nanofibers holds an array of converting and reflective layers in a position parallel to the axis of the reflector. The converting layers (e.g., 550 and 560) are located in a position that divides the volume of the reflector into two volumes. The structure 500 includes two light sources (e.g., two LEDs or other light sources) to supply respectively excitation light (in this example, blue light) to the converting layers 550 and 560. The central layer in FIG. 16 is a plane reflector for example made of reflective nanofibers (or other suitable reflector of light). The color converting layer 550 in FIG. 16 can be for example a layer of photoluminescent nanofibers that produces green light, while color converting layer 560 can be a layer of photoluminescent nanofibers that produces red light.

More specifically, in the configuration of FIG. 16, green and red photoluminescent nanofiber sheets (PLNs) 550 and 560 are placed back to back and separated by a reflecting layer 570 such as aluminum foil or an aluminum thin film. Each PLN is pumped by its own short wavelength LED 580, 590 such as those emitting wavelengths such as 410, 450, 460 or 470 nm. Light output from each LED can be adjusted by altering the LED driving voltage. The pump light and the red and green lights are not configured to mix until exiting the reflector 500.

By combining blue light from the emission source (i.e., the primary light) and emissions from red to green PLNs (i.e., the secondary light), white light is produced. Such white light can be used as is or optically mixed to eliminate any vestiges of the separate R, G, or B lights by using devices such as an integrating sphere or high transmittance diffuser polymeric film such as those available from Brightview Technologies. Alternatively, the diffuse reflection properties of the reflective nanofiber material serves to optically mix the separate R, G, B light. This is an important advantage of the nanofiber reflector material which optically mixes the separate R, G, B lights to produce white light emanating from the structure.

In the various embodiments described above, the light sources can be LEDs used to excite the PLNs (or color conversion layers) which may emit one primary wavelength or emit different primary wavelengths. For example, one LED could emit at 460 nm and the second could emit at 410 nm.

One advantage of the nanofiber base of the PLNs is that it represents a diffuse Lambertian reflector under certain circumstances. Thus, light incident on a diffuse reflecting nanofiber will not be specularly reflected but rather will be scattered at all angles with a cosine θ dependence with respect to the surface normal (i.e., following Lambert's emission law).

An alternative to having separate green and red PLNs, each pumped by a blue light, is to have a green PLN excited by a blue LED and in the second compartment have a red LED impinging on an undoped nanofiber substrate. This design could still be configured to emit blue, green and red light in the proper proportionality to generate white light, and the reflective layer may not be required. This approach represents a solution to the so-called "green gap" of low performing LEDs. Alternatively, green or red phosphors could be used in place of quantum dots. Alternatively, blue and red LEDs could be aimed at a green PLN to produce white light. Multiple blue or red LEDs can be added to the reflector block to impart greater control over the light produced.

In addition to the embodiments listed above, there are several additional embodiments of this invention. These embodiments include:

1) Incorporation of an optically clear encapsulant such as an epoxy or a silicone-based encapsulant available from suppliers such as General Electric or Dow Corning in at least a portion of the RPRB structure. Such encapsulants may or may not contain luminescent particles. With this embodiment, the index of refraction of these encapsulants is chosen to maintain the diffuse reflectance nature of the nanofiber component of the PLN.
2. In addition, the reflector block can be made out of reflective materials including but not limited to stamped metal, metallized plastics, and metallized glass. Reflective nanofiber substrates can be attached to these structures through adhesives to provide for high reflectance as described above.
3. The RPRB can be incorporated into a larger structure to create other lighting devices such as lamps or luminaires. For example, the RPRB could be formed in the base of a glass "Edison" bulb where a portion of the glass walls may be metallized to provide some of the functionality of the reflector block. In this embodiment, the frosted coating on the "Edison" bulb would be used as a means of mixing the red, green, and blue colors to produce white light. The electrical drivers for the RPRB "Edison" bulb could be contained in the Edisonian socket in much the same way that the ballast for compact fluorescent lights is contained at the base of the bulb.
4. In addition to incorporating luminescent nanoparticles into the PLNs are described above, other luminescent materials and phosphors can be incorporated into the PLNs. One example includes the incorporation of green phosphors such as the sulfoselenide compositions sold by PhosphorTech or doped silicates sold by Intematix, as discussed above.
5. Additional optical elements such as low-pass optical filters can be added at the input port of the light source to prevent loss of the secondary emission from the photoluminescent nanofiber.

Presently, the RPRB embodiment has yielded the following color rendering indexes (CRI) and correlated color temperatures (CCT). By comparison, measured values for commercial white LEDs have a range of CCT values depending upon the color of the lamp. "Cool white" lamps have CCTS between 5,000 K and 10,000K, "neutral white" lamps have CCTs between 3,700 K and 5,000 K, and "warm white" lamps have CCTs between 2,600 K and 3,700 K. The typical CRI of these lamps is approximately 83. Higher CCTs correspond to a bluish appearance of the light source whereas lower CCTs correspond to a more reddish appearance. CRI refers to the ability to reproduce colors accurately and values above 80 are acceptable for general illumination.

Working Examples

Figure 17:
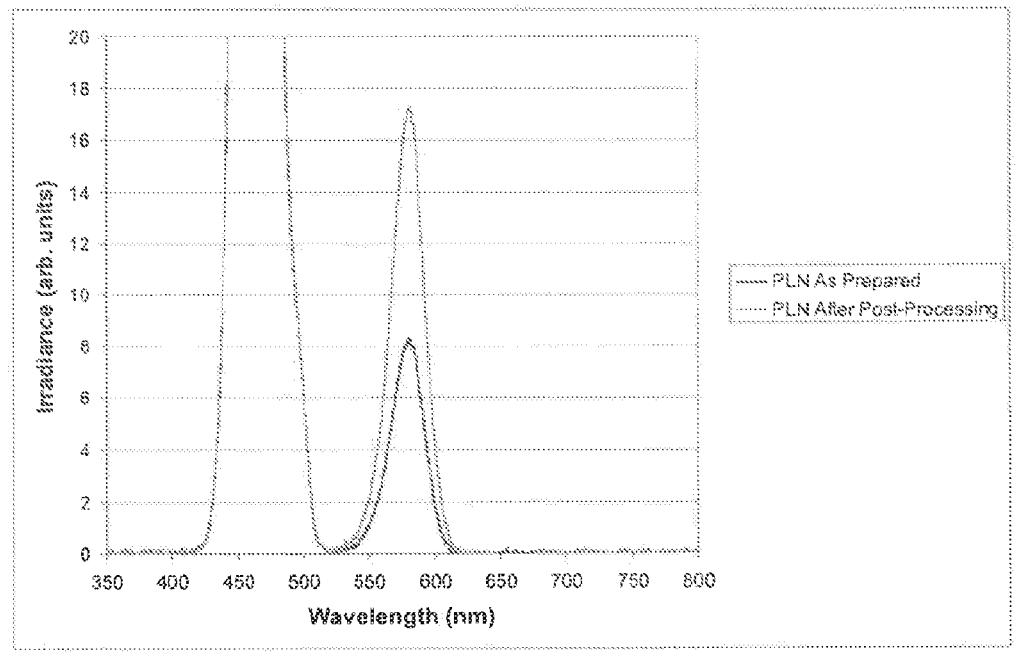
FIG. 17 is a depiction of the improvements in quantum efficiency provided in one embodiment of the invention where the photoluminescent nanodots are attached to the outside of nanofiber.

FIG. 17 shows a depiction of the improvements in quantum efficiency provided in one embodiment of the invention where the photoluminescent quantum dots are attached to the outside of nanofiber, as described above in the Luminescent Devices section. The resulting photoluminescent nanofiber structure was then treated with actinic radiation for a period between 1 and 48 hours. The actinic radiation is typically provided in the wavelength range of 350 to 490 nm at optical power levels between 0.5 µW/cm$^2$ to 10 mW/cm$^2$. This treatment effect was unexpectedly found to produce an increase in the quantum efficiency of photoluminescent nanofibers containing quantum dots. FIG. 17 shows specifically a doubling in efficiency. Further, testing has shown that quantum efficiencies of greater than 70% are achieved for photoluminescent nanofibers including a variety of light stimulatable particles including quantum dots and phosphors.

Figure 18:
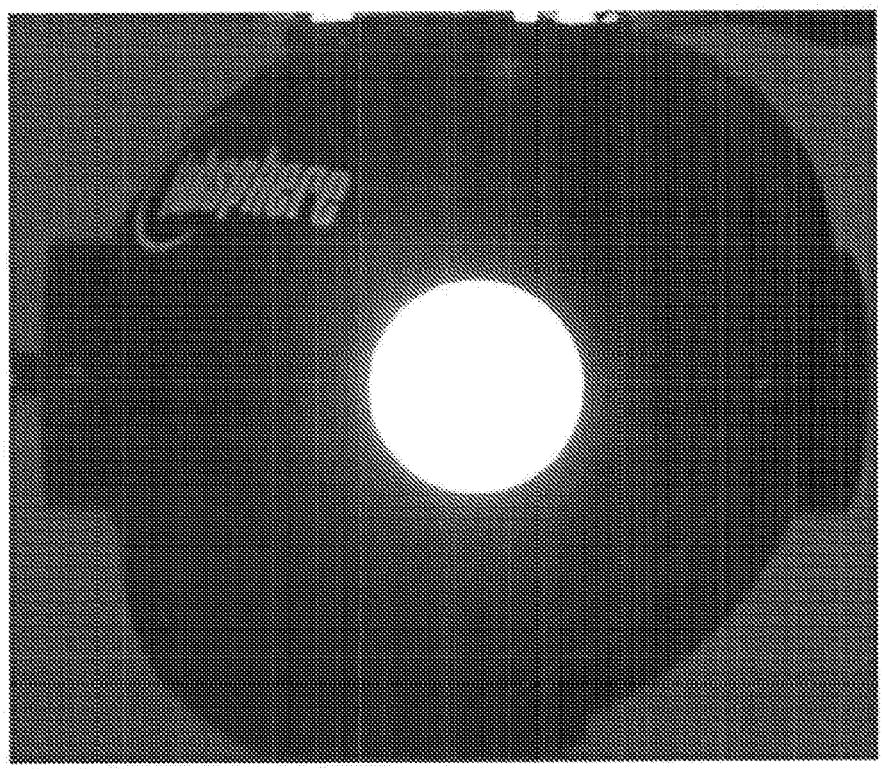
FIG. 18 is a photograph of an integrating sphere emitting light created by a luminaire according to one embodiment of this invention.

FIG. 18 below shows an optical photograph of the RPRB structure emitting white light. In this example, a blue LED emitting at 460 nm was used to excite a luminescent layer stack including a green phosphor and a PMMA nanofiber. To achieve the desired white light color, red-orange emissions from an LED was added through the RPRB structure. An integrating sphere (as discussed above) was used in this example to mix the primary and secondary light emanating from the RPRB structure to produce the resulting white light.

Figure 19:
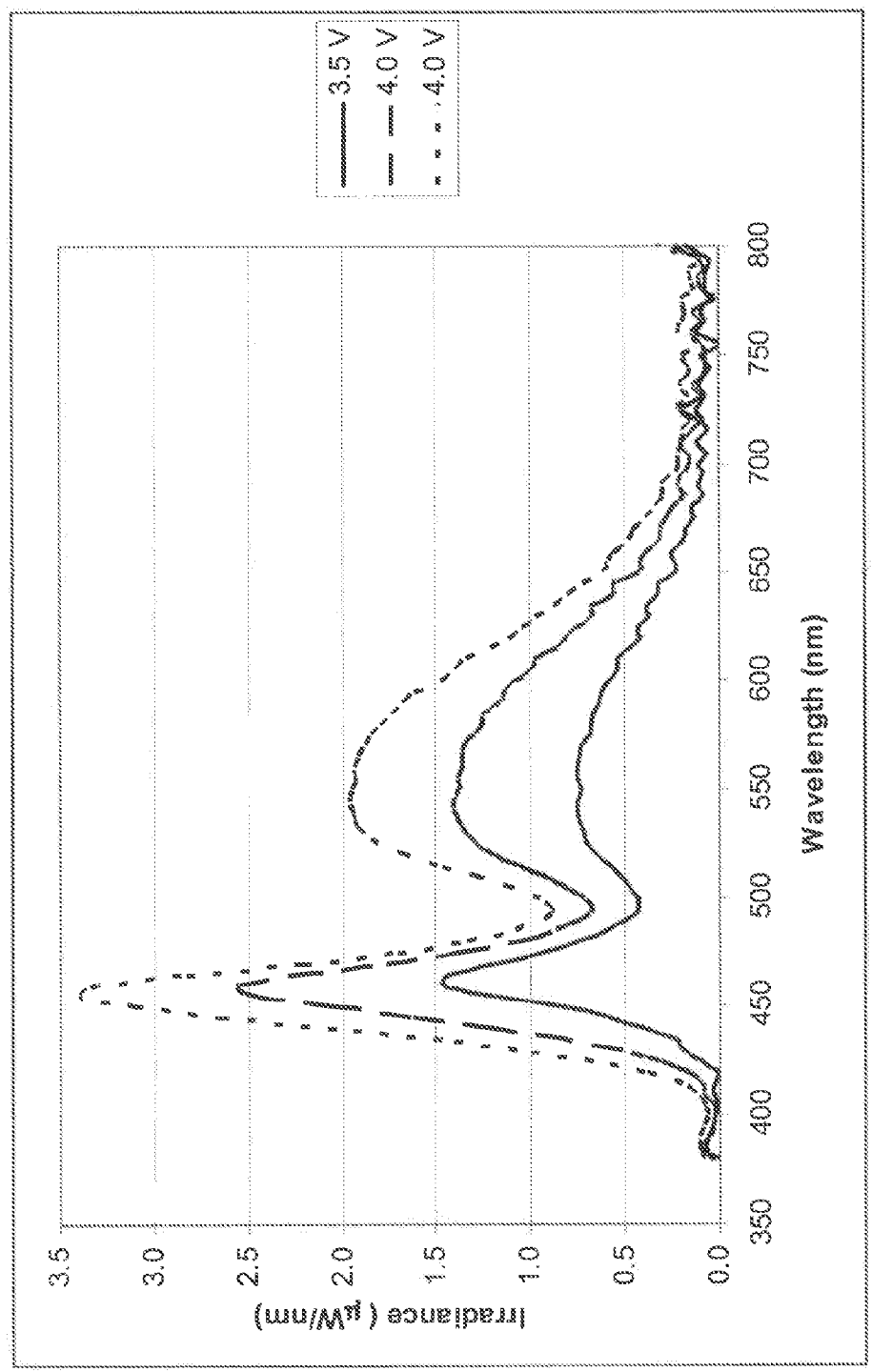
FIG. 19 depicts optical spectra from YAG:Ce screen-printed on glass slides, inserted into the RPRB structure of the invention and tested.

FIG. 19 shows optical spectra from a YAG:Ce screen-printed on a glass slide, inserted into the RPRB structure and tested. Performance here is similar to many commercial "cool white" LEDs. The different traces represent different power levels applied from the blue light LEDs used here to excite the conversion to lower wavelengths, resulting in the mixing of blue light with the other primary colors to produce white light. The color rendering index (CRI) for the YAG:Ce screen-prints were around 80.

Figure 20:
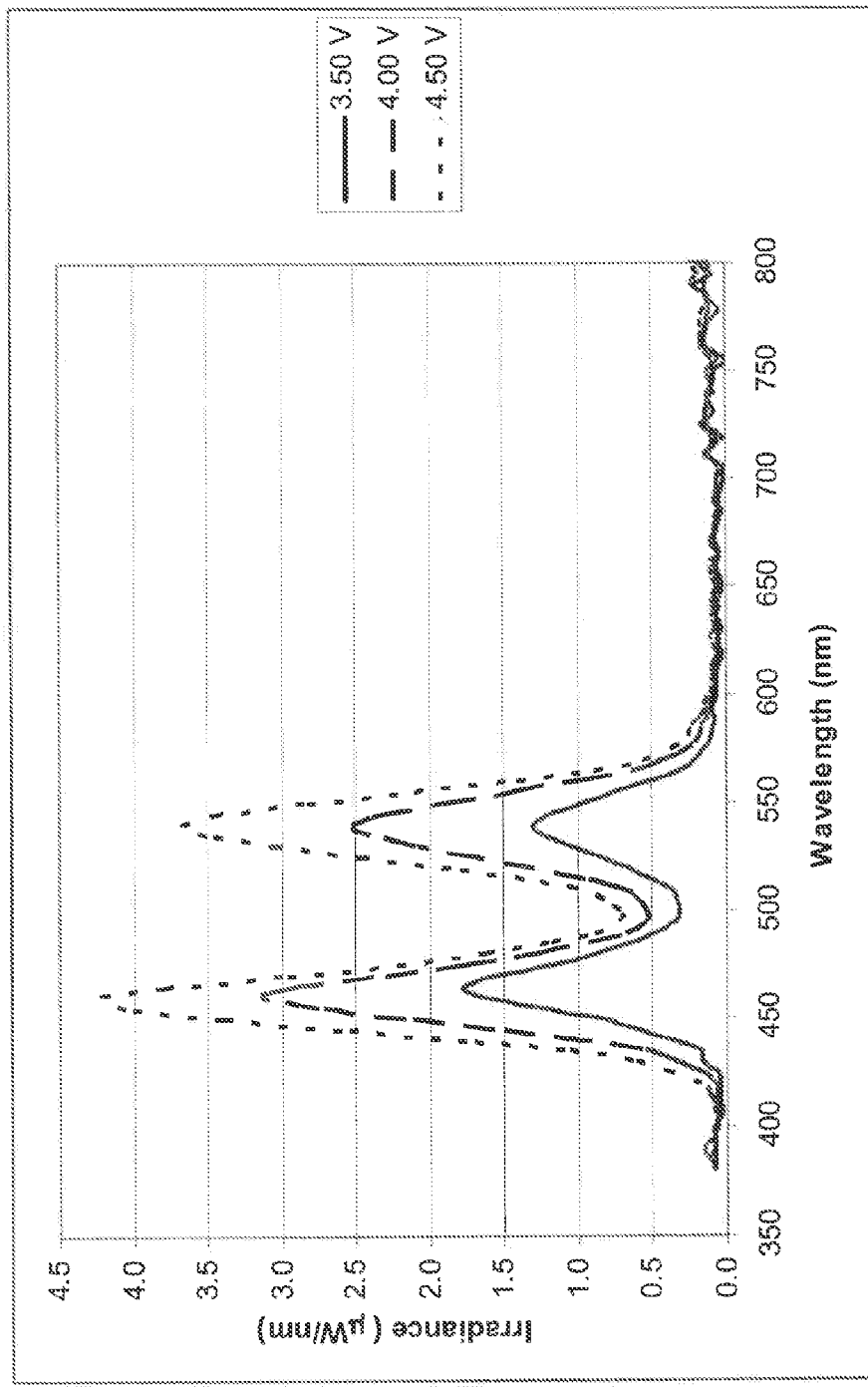
FIG. 20 depicts optical spectra from YAG:Ce screen-printed on a glass slide, inserted into the RPRB structure of the invention and tested.

FIG. 20 shows optical spectra from a hexane solution of green emitting quantum dots (obtained from Evident Technology), identified here as "formula 1." Performance here is distinct from that shown in FIG. 19 for "cool white" light; primarily, the emission peak is narrower. The different traces represent different power levels applied from the blue light LEDs used here to excite the conversion to lower wavelengths, resulting in the mixing of blue light with the other primary colors to produce white light. This solution was used to coat a PMMA nanofiber, and spectra comparable to that of FIG. 20 were obtained. When red-orange light was introducing through the second light source aperture on the RPRB, the resulting photoluminescent nanofiber structure exhibited CRIs between 40 and 90 and CCTs between 3,000 K and 8,000 K.

Figure 21:
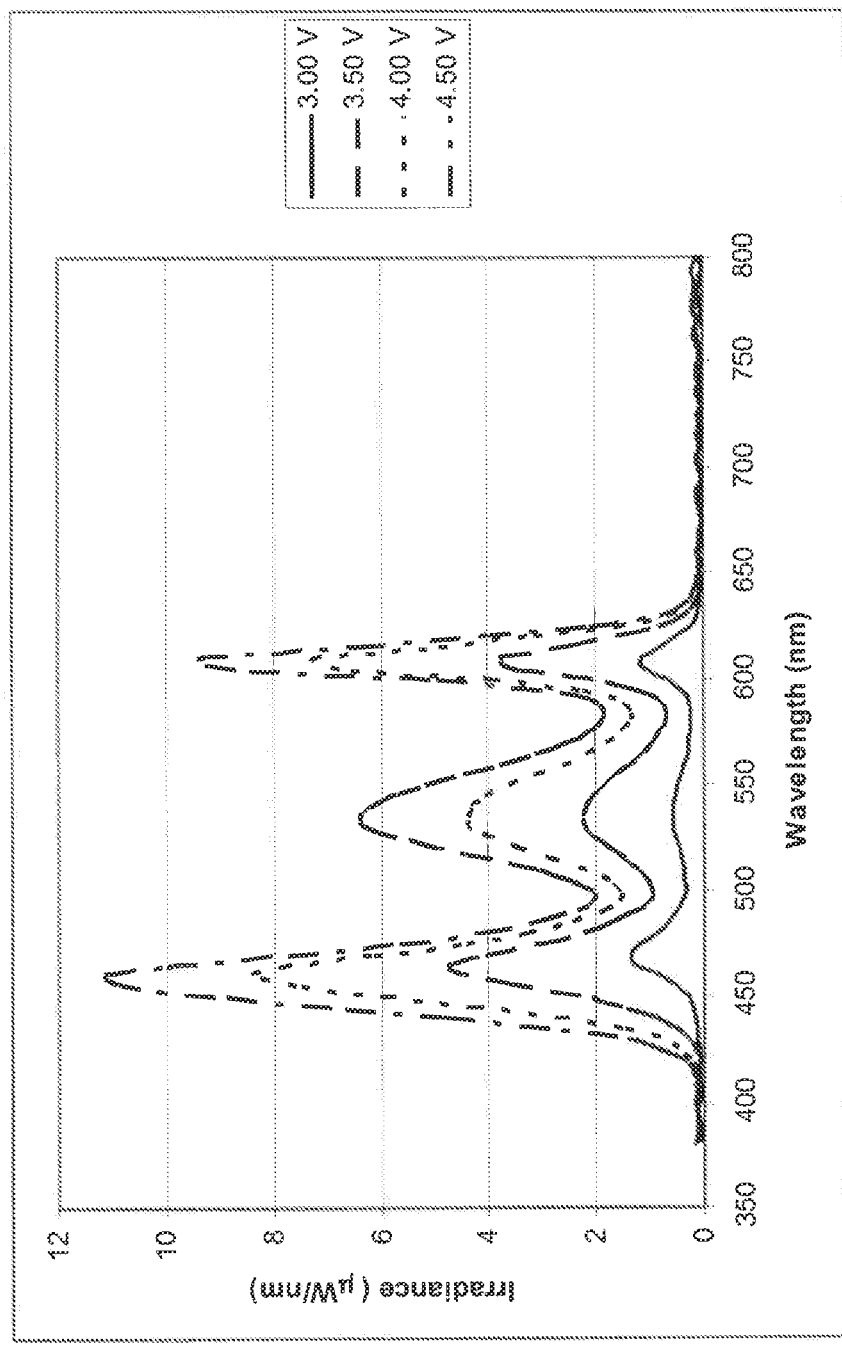
FIG. 21 depicts optical spectra from a hexane solution of green emitting quantum dots, inserted into the RPRB structure of the invention and tested.
Figure 22:
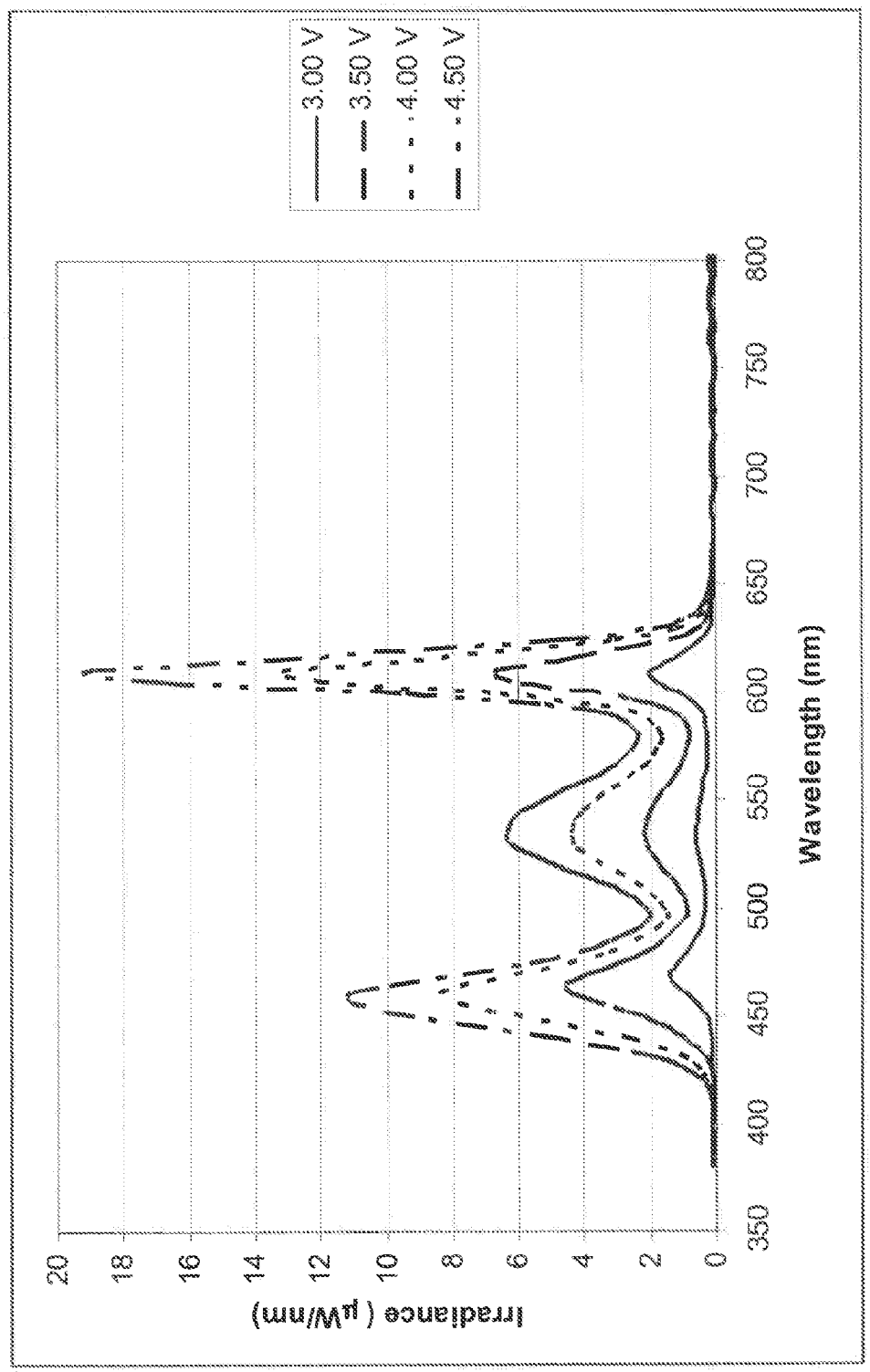
FIG. 22 depicts optical spectra from a photoluminescent nanofiber created by coating a PMMA nanofiber with a green phosphor, inserted into the RPRB structure of the invention and tested.

FIGS. 21-22 show optical spectra from a photoluminescent nanofiber created by coating a PMMA nanofiber with a green phosphor. The luminescent materials producing the results in FIGS. 21-22 were both the same combination of luminescent materials which included a sulfoselenide phosphor that emits green radiation. The level of red-orange lighting introduced through the RPRB structure was different, with the setting in FIG. 21 being chosen to produce a "cool white" light while that in FIG. 22 were chosen to produce a "neutral white" light." The different traces within FIGS. 21 and 22 represent different power levels applied from the blue light LEDs used here to excite the conversion to longer wavelengths, resulting in the mixing of blue light with the other primary colors to produce white light. In FIG. 21, which represents a "cool white" light produced with the RPRB structure, CCTs between 6652 K and 9044 K were produce and the CRI levels were 76 to 91. In FIG. 22, which represents a "neutral white" lighting produced with the RPRB structure, CCTs between 4200 K and 4672 K were produced and the CRI levels were between 65 and 78. Additional formulations are possible with the invention, which can produce higher CRI values in "neutral white" and "warm white" lighting. For example, adjusting the materials and LED setting in the RPRB, a high CRI neutral white can be produced from this formulation by adjusting the relative intensities of the blue:green:red emissions to approximately 1:1:2.2. This lighting device will have a CCT and CRI of approximately 4,500 K and 88, respectively. Further adjustment of the blue:green:red ratios can be used to achieve high "Warm White" formulations. For example, adjusting the relative intensity ratios of the materials used above to approximately 1:2:6 (blue:green:red) will produce a warm white light source with a CCT of 3,250 K and a CRI of 84.

Numerous modifications and variations of the invention are possible in light of the above teachings. It is therefore to be understood that within the scope of the appended claims, the invention may be practiced otherwise than as specifically described herein.

The invention claimed is:
1. A fiber-based reflective lighting device comprising:
a source configured to generate a primary light;
a mat of reflective fibers;
said fibers layered upon each other in a random manner to form a structure which diffusively reflects at least 70% of incident visible light upon illumination with at least the primary light, and
a light exit configured to emanate the reflected light.

2. The device of claim 1, further comprising:
a luminescent sheet including light stimulatable particles configured to emit secondary light upon receiving the primary light.

3. The device of claim 2, wherein the light emanated from the light exit has a color rendering index greater than 70.

4. The device of claim 1, wherein the mat of reflective fibers reflects said incident visible light backward.

5. The device of claim 4, wherein the mat of reflective fibers comprises:
at least one of a planar or a curved reflector surface disposed behind or in front of the luminescent sheet.

6. The device of claim 4, wherein the reflector surface comprise spherical or cylindrical reflector surfaces.

7. The device of claim 1, wherein the reflective fibers comprise a dielectric material having an index of refraction greater than 1.6.

8. The device of claim 7, wherein the dielectric material comprises at least one of $BaSO_4$, $ZnO$, $TiO_2$, and $Al_2O_3$.

9. The device of claim 1, wherein the mat of reflective fibers comprises a reflective material having a reflectivity greater than 0.8.

10. The device of claim 9, wherein the reflective material comprises at least one of Al, Au, Ag, $TiO_2$, ZnO, $BaSO_4$, and Zn.

11. The device of claim 1, wherein the reflective fibers comprise flat-shaped nanofibers comprising a laterally extending surface for reflection of the light.

12. The device of claim 11, wherein the laterally extending surface comprises a surface with a lateral extension of 1 micron or larger.

13. The device of claim 11, wherein the laterally extending surface comprises a surface with a lateral extension of 10 microns or larger.

14. The device of claim 11, wherein the laterally extending surface comprises a surface with a lateral extension of 20 microns or larger.

15. The device of claim 11, wherein the laterally extending surface comprises a surface with a lateral extension of 50 microns or larger.

16. The device of claim 1, further comprising:
an optically clear encapsulant securing the mat of reflective fibers.

17. The device of claim 16, wherein the encapsulant has an index of refraction that differs from the material being encapsulated by at least 0.10.

18. The device of claim 1, wherein the mat of reflective fibers comprises: at least one of a planar or a curved reflector surface.

19. The device of claim 1, wherein the source configured to generate said primary light comprises a light emitting diode.

20. The device of claim 3, where the luminescent sheet includes a diffuse reflector.

21. The device of claim 1, wherein the mat of reflective fibers comprises fibers having an average fiber diameter in a range between 50 to 2,000 nm.

22. The device of claim 21, wherein the fibers have an average fiber diameter is in a range between 100 nm to 800 nm.

23. The device of claim 21, wherein the fibers have a thickness in a range between 0.01 microns and 2,000 microns.

24. The device of claim 1, wherein the mat of reflective fibers has a thickness in a range between 1 to 500 microns.

25. The device of claim 1, further comprising:
stimulatable particles disposed at least on a surface of the mat of reflective fibers or a surface of nanofibers separate from the mat of reflective fibers and comprising luminescent particles.

26. The device of claim 25, wherein the luminescent particles comprise at least one of quantum dots and phosphors.

27. The device of claim 26, wherein the quantum dots comprise at least one of silicon, germanium, indium phosphide, indium gallium phosphide, indium phosphide, cadmium sulfide, cadmium selenide, lead sulfide, copper oxide, copper selenide, gallium phosphide, mercury sulfide, mercury selenide, zirconium oxide, zinc oxide, zinc sulfide, zinc selenide, zinc silicate, titanium sulfide, titanium oxide, and tin oxide.

28. The device of claim 26, wherein the phosphors comprise at least one of a rare-earth doped metal oxide including $Y_2O_3$:Tb, $Y_2O_3$:$Eu^{3+}$, $Lu_2O_3$:$Eu^{3+}$, $CaTiO_3$:$Pr^{3+}$, CaO:$Er^{3+}$, (GdZn)O:$Eu^{3+}$, $Sr_4Al_{14}O_{25}$:$Eu^{3+}$, $GdMgB_5O_{10}$:$Ce^{3+}$:$Tb^{3+}$, $CeMgAl_{11}O_{19}$:$Ce^{3+}$:$Tb^{3+}$, $Y_2O_3$:$Eu^{3+}$, a rare-earth doped yttrium aluminum garnet (YAG) including YAG:$Ce^{3+}$, a rare-earth doped zirconium oxide including $ZrO_2$:$Sm^{3+}$ and $ZrO_2$:$Er^{3+}$, rare earth doped vanadates and phosphates including ($YVO_4$:Eu) and (La, Ce, Tb)$PO_4$, doped materials having a host matrix including one $Gd_2O_3$, $GdO_2S$, PbO, ZnO, ZnS, and ZnSe and including one of a dopant of Eu, Tb, Tm and Mn, metal-doped forms of zinc sulfide and zinc selenide including ZnS:$Mn^{2+}$ and ZnS:$Cu^+$, $Zn_{0.25}Cd_{0.75}S$:AgCl, metal sulfides including CaS:$Eu^{2+}$, $SrGa_2S_4$:Eu and $Ca_wSr_x$-$Ga_y(S,Se)_z$:Eu, doped silicates, and metal silicates including $Ca_3(Sc,Mg)_2Si_3O_{12}$:Ce and $(Ba,Sr)_2SiO_4$:Eu.

29. The device of claim 26, wherein the phosphors comprise at least one of rare-Earth doped YAG, rare-Earth doped ZnS, rare-Earth doped $SrGa_2S_4$, rare-Earth doped ZnSe, rare-Earth doped silicates, and sulfoselenides.

30. The device of claim 26, wherein the phosphor comprises a nano-phosphor.

31. The device of claim 1, wherein the mat of reflective fibers reflects at least 70% of all visible light from 400 nm to 720 nm.

32. The device of claim 1, wherein the mat of reflective fibers reflects at least 80% of said visible light from 400 nm to 720 nm.

33. The device of claim 1, wherein the mat of reflective fibers reflects at least 90% of said visible light from 400 nm to 720 nm.

34. A lighting device comprising:
a housing;
a source configured to generate primary light and direct the primary light into the housing;
a reflective mat of fibers disposed inside the housing at a position to reflect the primary light, said fibers layered upon each other in a random manner to form a structure which diffusively reflects at least 70% of incident visible light; and
a light exit in the housing configured to emanate the reflected light from the housing.

35. The device of claim 34, further comprising a luminescent sheet disposed at a position in the housing to emit secondary light upon receiving primary light.

36. The device of claim 35, wherein the light emanated from the light exit has a color rendering index greater than 80.

37. The device of claim 34, wherein the mat of reflective fibers reflects said incident visible light backwards.

38. The device of claim 34, wherein the reflective fibers comprise a dielectric material having an index of refraction greater than 1.6.

39. The device of claim 37 wherein the dielectric material comprises at least one of $BaSO_4$, ZnO, $TiO_2$, and $Al_2O_3$.

40. The device of claim 34, wherein the mat of reflective fibers comprises a reflective material having a reflectivity greater than 0.80.

41. The device of claim 34, wherein the fibers comprise flat-shaped nanofibers comprising a laterally extending surface for reflection of the light.

42. The device of claim 41, wherein the laterally extending surface comprises a surface with a lateral extension of 1 micron.

43. The device of claim 41, wherein the laterally extending surface comprises a surface with a lateral extension of 10 microns.

44. The device of claim 41, wherein the laterally extending surface comprises a surface with a lateral extension of 20 microns.

45. The device of claim 41, wherein the laterally extending surface comprises a surface with a lateral extension of 50 microns.

46. A lighting device insert comprising:
a reflective mat of fibers for insertion in a lighting device at a position; and
said fibers layered upon each other in a random manner to form a structure which diffusively reflects at least 70% of incident visible light.

47. The insert of claim 46, wherein the fibers comprise a dielectric material having an index of refraction greater than 1.6.

48. The insert of claim 47, wherein the dielectric material comprises at least one of $BaSO_4$, ZnO, $TiO_2$, and $Al_2O_3$.

49. The insert of claim 46, wherein the mat of reflective fibers comprises a reflective material having a reflectivity greater than 0.80.

50. The insert of claim 46, wherein the fibers comprise flat-shaped nanofibers comprising a laterally extending surface for reflection of the light.

51. The insert of claim 50, wherein the laterally extending surface comprises a surface with a lateral extension of 1 micron.

52. The insert of claim 50, wherein the laterally extending surface comprises a surface with a lateral extension of 10 microns.

53. The insert of claim 50, wherein the laterally extending surface comprises a surface with a lateral extension of 20 microns.

54. The insert of claim 50, wherein the laterally extending surface comprises a surface with a lateral extension of 50 microns.

55. The device of claim 1, wherein the fibers have a length to diameter aspect ratio greater than 500,000:1 and less than 100,000,000:1.

56. The device of claim 34, wherein the fibers have a length to diameter aspect ratio greater than 500,000:1 and less than 100,000,000:1.

57. The insert of claim 50, wherein the fibers have a length to diameter aspect ratio greater than 500,000:1 and less than 100,000,000:1.

58. The device of claim 1, wherein the fibers comprise chopped fibers having a divided length from an original length before incorporation in said mat.

59. The device of claim 34, wherein the fibers comprise chopped fibers having a divided length from an original length before incorporation in said mat.

60. The insert of claim 50, wherein the fibers comprise chopped fibers having a divided length from an original length before incorporation in said mat.

\* \* \* \* \*